US010872395B2

(12) United States Patent
Ogino et al.

(10) Patent No.: US 10,872,395 B2
(45) Date of Patent: Dec. 22, 2020

(54) IMAGE PROCESSING DEVICE, IMAGING SYSTEM PROVIDED THEREWITH, AND CALIBRATION METHOD

(71) Applicant: PANASONIC INTELLECTUAL PROPERTY MANAGEMENT CO., LTD., Osaka (JP)

(72) Inventors: Ryoji Ogino, Kanagawa (JP); Junya Kuwada, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 121 days.

(21) Appl. No.: 16/088,697

(22) PCT Filed: Apr. 6, 2017

(86) PCT No.: PCT/JP2017/014327
§ 371 (c)(1),
(2) Date: Sep. 26, 2018

(87) PCT Pub. No.: WO2017/187923
PCT Pub. Date: Nov. 2, 2017

(65) Prior Publication Data
US 2019/0114740 A1 Apr. 18, 2019

(30) Foreign Application Priority Data

Apr. 25, 2016 (JP) .................................. 2016-087443

(51) Int. Cl.
*G06F 3/01* (2006.01)
*G06F 3/0487* (2013.01)
(Continued)

(52) U.S. Cl.
CPC ............ *G06T 3/4038* (2013.01); *G03B 15/00* (2013.01); *G06F 3/017* (2013.01); *G06F 3/0412* (2013.01);
(Continued)

(58) Field of Classification Search
CPC ....... G03B 37/04; G03B 15/00; G06F 3/0412; G06F 3/017; G06F 3/0487;
(Continued)

(56) References Cited

U.S. PATENT DOCUMENTS 6,324,545 B1 * 11/2001 Morag ............... H04N 1/00132
358/408
8,677,282 B2 * 3/2014 Cragun ............... G06F 3/04883
715/863
(Continued)

FOREIGN PATENT DOCUMENTS

JP 2008-070968 3/2008
JP 2010-050842 3/2010
(Continued)

OTHER PUBLICATIONS

Schoeffmann et al. ("Video navigation on tablets with multi-touch gestures," IEEE International Conference on Multimedia and Expo Workshops (ICMEW), Jul. 14-18, 2014) (Year: 2014).*
(Continued)

*Primary Examiner* — Yubin Hung
(74) *Attorney, Agent, or Firm* — Greenblum & Bernstein. P.L.C.

(57) ABSTRACT

An image processing device includes a stitching processing unit that composites composition source images generated from captured images under a preset processing condition to generate a composite image, a screen generation unit that generates a screen and outputs the composite image to a display input device, a touch operation determination unit that determines a camera image region to be adjusted based on a detection result of a touch operation on the screen and determines an adjustment item according to an operation mode of the touch operation, and a processing condition setting unit that sets a temporary processing condition related to the camera image region to be adjusted. The stitching processing unit generates the composition source image from the captured image of the camera corresponding to the camera image region to be adjusted under the temporary processing condition and updates the composite image by compositing the composition source images.

14 Claims, 17 Drawing Sheets

| | OPERATION MODE | ADJUSTMENT ITEM |
|---|---|---|
| ADJUSTMENT RELATED TO IMAGE OF HORIZONTAL CAMERA | SWIPE OPERATION IN HORIZONTAL DIRECTION WITH ONE FINGER | PAN (POSITION ADJUSTMENT IN HORIZONTAL DIRECTION) |
| | SWIPE OPERATION IN VERTICAL DIRECTION WITH ONE FINGER | TILT (POSITION ADJUSTMENT IN VERTICAL DIRECTION) |
| | ROTATION OPERATION WITH TWO FINGERS | ROLLING (POSITION ADJUSTMENT IN ROTATION DIRECTION) |
| | PINCH OPERATION WITH TWO FINGERS | ZOOM (EXTENSION/CONTRACTION ADJUSTMENT) |
| ADJUSTMENT RELATED TO IMAGE OF UPWARD CAMERA | SWIPE OPERATION IN HORIZONTAL DIRECTION WITH ONE FINGER | ROLLING (POSITION ADJUSTMENT IN ROTATION DIRECTION) |
| | SWIPE OPERATION IN VERTICAL DIRECTION WITH ONE FINGER | TILT (POSITION ADJUSTMENT IN VERTICAL DIRECTION) |
| ADJUSTMENT RELATED TO IMAGES OF ALL OF CAMERAS | SWIPE OPERATION IN HORIZONTAL DIRECTION WITH THREE OR MORE FINGERS | PAN (POSITION ADJUSTMENT IN HORIZONTAL DIRECTION) |
| | SWIPE OPERATION IN VERTICAL DIRECTION WITH THREE OR MORE FINGERS | TILT (POSITION ADJUSTMENT IN VERTICAL DIRECTION) |
| | ROTATION OPERATION WITH THREE OR MORE FINGERS | ROLLING (POSITION ADJUSTMENT IN ROTATION DIRECTION) |
| | PINCH OPERATION WITH THREE OR MORE FINGERS | ZOOM (EXTENSION/CONTRACTION ADJUSTMENT) |

(51) Int. Cl.
| | |
|---|---|
| *G06F 3/0488* | (2013.01) |
| *G06T 3/40* | (2006.01) |
| *H04N 5/232* | (2006.01) |
| *G03B 15/00* | (2006.01) |
| *H04N 5/262* | (2006.01) |
| *H04N 7/18* | (2006.01) |
| *G06T 7/11* | (2017.01) |
| *G06F 3/041* | (2006.01) |
| *G06K 9/60* | (2006.01) |

(52) U.S. Cl.
CPC ........ *G06F 3/0487* (2013.01); *G06F 3/04883* (2013.01); *G06K 9/60* (2013.01); *G06T 7/11* (2017.01); *H04N 5/232* (2013.01); *H04N 5/23216* (2013.01); *H04N 5/2625* (2013.01); *H04N 5/2628* (2013.01); *H04N 7/181* (2013.01)

(58) Field of Classification Search
CPC .... G06F 3/04883; G06K 9/2081; G06K 9/32; G06K 9/60; G06T 3/4038; G06T 7/11; H04N 5/232; H04N 5/23216; H04N 5/2625; H04N 5/2628; H04N 7/181
See application file for complete search history.

(56) References Cited

U.S. PATENT DOCUMENTS

| | | | | |
|---|---|---|---|---|
| 2004/0252884 | A1* | 12/2004 | Foote | H04N 9/045 382/162 |
| 2006/0097991 | A1* | 5/2006 | Hotelling | G06F 3/0414 345/173 |
| 2010/0328306 | A1* | 12/2010 | Chau | G02B 30/27 345/419 |
| 2011/0085016 | A1* | 4/2011 | Kristiansen | G06F 3/04883 348/14.03 |
| 2011/0195781 | A1* | 8/2011 | Chen | A63F 13/214 463/37 |
| 2011/0197147 | A1* | 8/2011 | Fai | G06F 3/017 715/753 |
| 2012/0282974 | A1* | 11/2012 | Green | H04W 4/12 455/550.1 |
| 2013/0093727 | A1* | 4/2013 | Eriksson | G06F 1/169 345/175 |
| 2014/0082491 | A1* | 3/2014 | Adachi | G06F 3/0488 715/702 |
| 2014/0215365 | A1* | 7/2014 | Hiraga | G06F 3/04883 715/765 |
| 2015/0277705 | A1* | 10/2015 | Autioniemi | G06F 3/04883 715/723 |
| 2015/0356735 | A1* | 12/2015 | Shimizu | B60R 11/04 348/148 |

FOREIGN PATENT DOCUMENTS

| | | |
|---|---|---|
| JP | 2014-147057 | 8/2014 |
| WO | 2012/160833 | 11/2012 |

OTHER PUBLICATIONS

International Search Report (ISR) from International Searching Authority (Japan Patent Office) in International Pat. Appl. No. PCT/JP2017/014327, dated Jun. 27, 2017.

* cited by examiner

PAN ADJUSTMENT
(POSITION ADJUSTMENT IN HORIZONTAL DIRECTION)

TILT ADJUSTMENT
(POSITION ADJUSTMENT IN VERTICAL DIRECTION)

ROLLING ADJUSTMENT
(POSITION ADJUSTMENT IN ROTATION DIRECTION)

ZOOM ADJUSTMENT
(EXTENSION/CONTRACTION ADJUSTMENT)

FIG. 7

|  | OPERATION MODE | ADJUSTMENT ITEM |
|---|---|---|
| ADJUSTMENT RELATED TO IMAGE OF HORIZONTAL CAMERA | SWIPE OPERATION IN HORIZONTAL DIRECTION WITH ONE FINGER | PAN (POSITION ADJUSTMENT IN HORIZONTAL DIRECTION) |
|  | SWIPE OPERATION IN VERTICAL DIRECTION WITH ONE FINGER | TILT (POSITION ADJUSTMENT IN VERTICAL DIRECTION) |
|  | ROTATION OPERATION WITH TWO FINGERS | ROLLING (POSITION ADJUSTMENT IN ROTATION DIRECTION) |
|  | PINCH OPERATION WITH TWO FINGERS | ZOOM (EXTENSION/CONTRACTION ADJUSTMENT) |
| ADJUSTMENT RELATED TO IMAGE OF UPWARD CAMERA | SWIPE OPERATION IN HORIZONTAL DIRECTION WITH ONE FINGER | ROLLING (POSITION ADJUSTMENT IN ROTATION DIRECTION) |
|  | SWIPE OPERATION IN VERTICAL DIRECTION WITH ONE FINGER | TILT (POSITION ADJUSTMENT IN VERTICAL DIRECTION) |
| ADJUSTMENT RELATED TO IMAGES OF ALL OF CAMERAS | SWIPE OPERATION IN HORIZONTAL DIRECTION WITH THREE OR MORE FINGERS | PAN (POSITION ADJUSTMENT IN HORIZONTAL DIRECTION) |
|  | SWIPE OPERATION IN VERTICAL DIRECTION WITH THREE OR MORE FINGERS | TILT (POSITION ADJUSTMENT IN VERTICAL DIRECTION) |
|  | ROTATION OPERATION WITH THREE OR MORE FINGERS | ROLLING (POSITION ADJUSTMENT IN ROTATION DIRECTION) |
|  | PINCH OPERATION WITH THREE OR MORE FINGERS | ZOOM (EXTENSION/CONTRACTION ADJUSTMENT) |

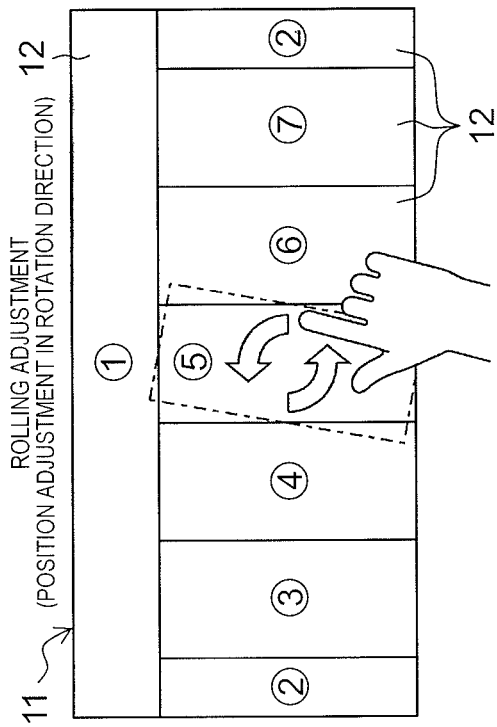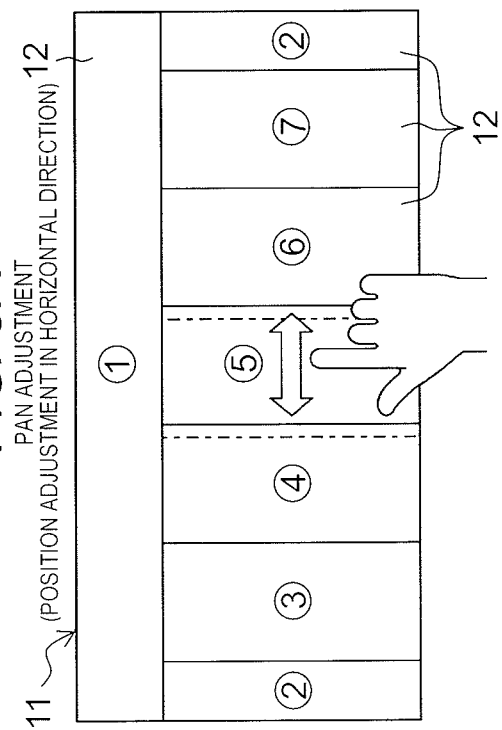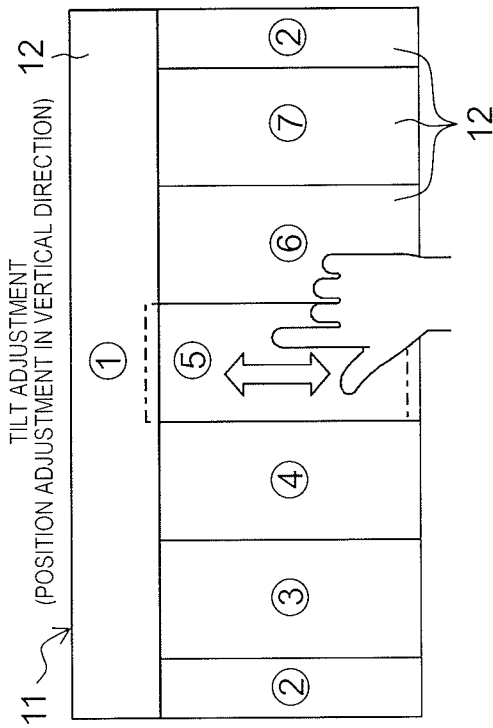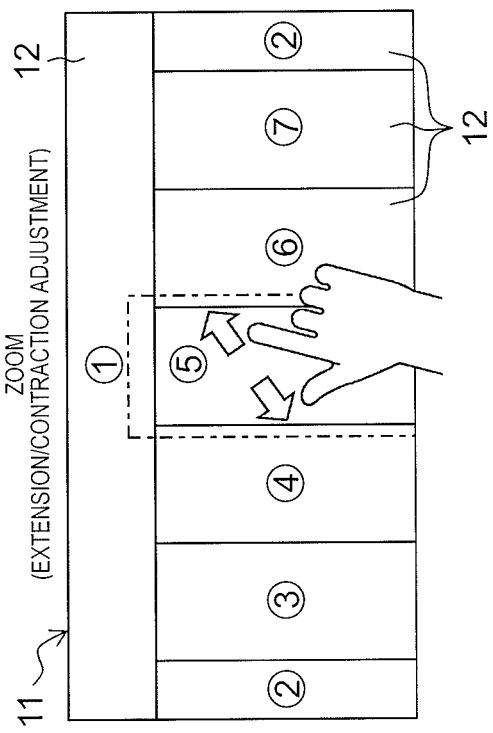

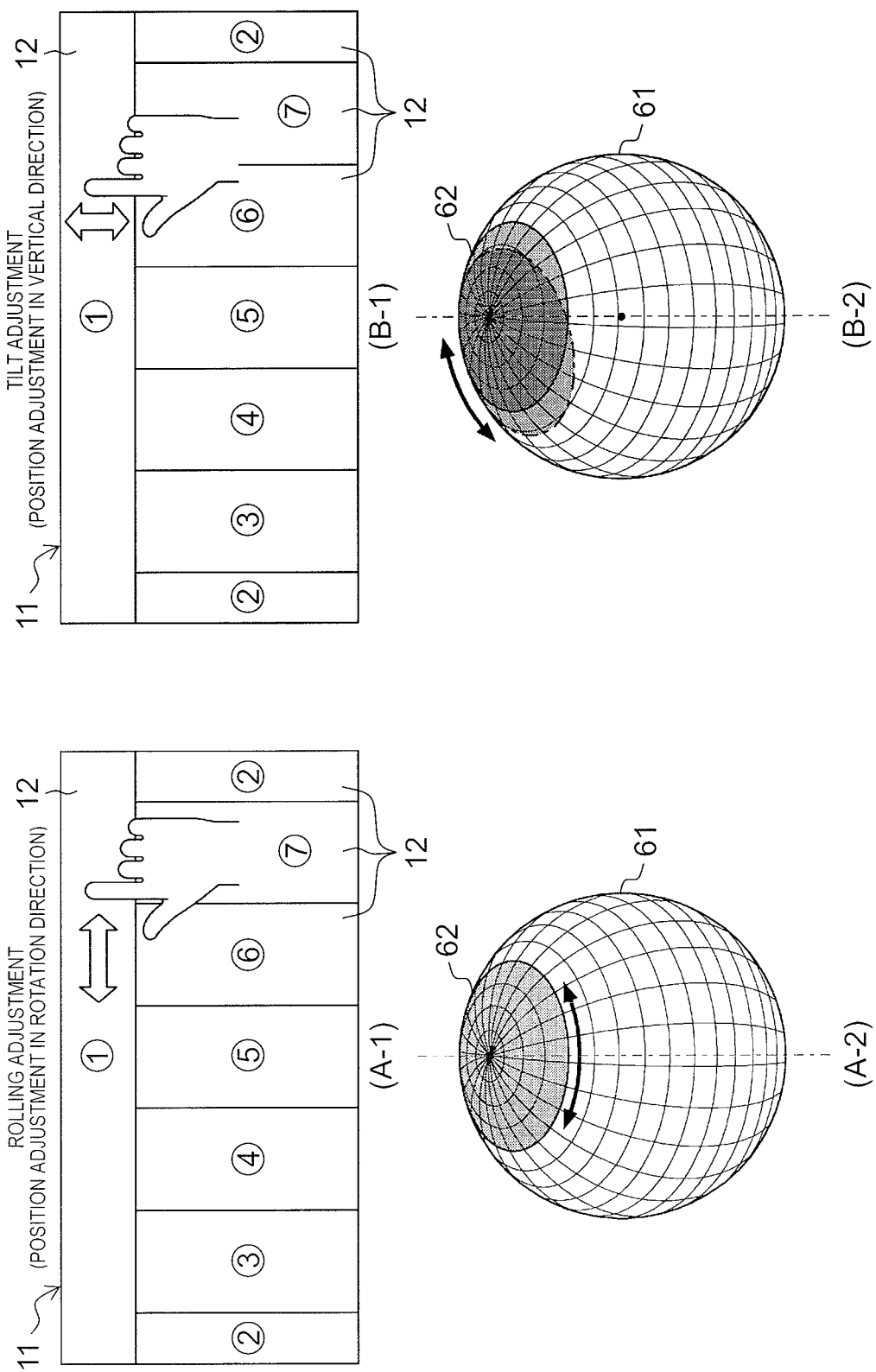

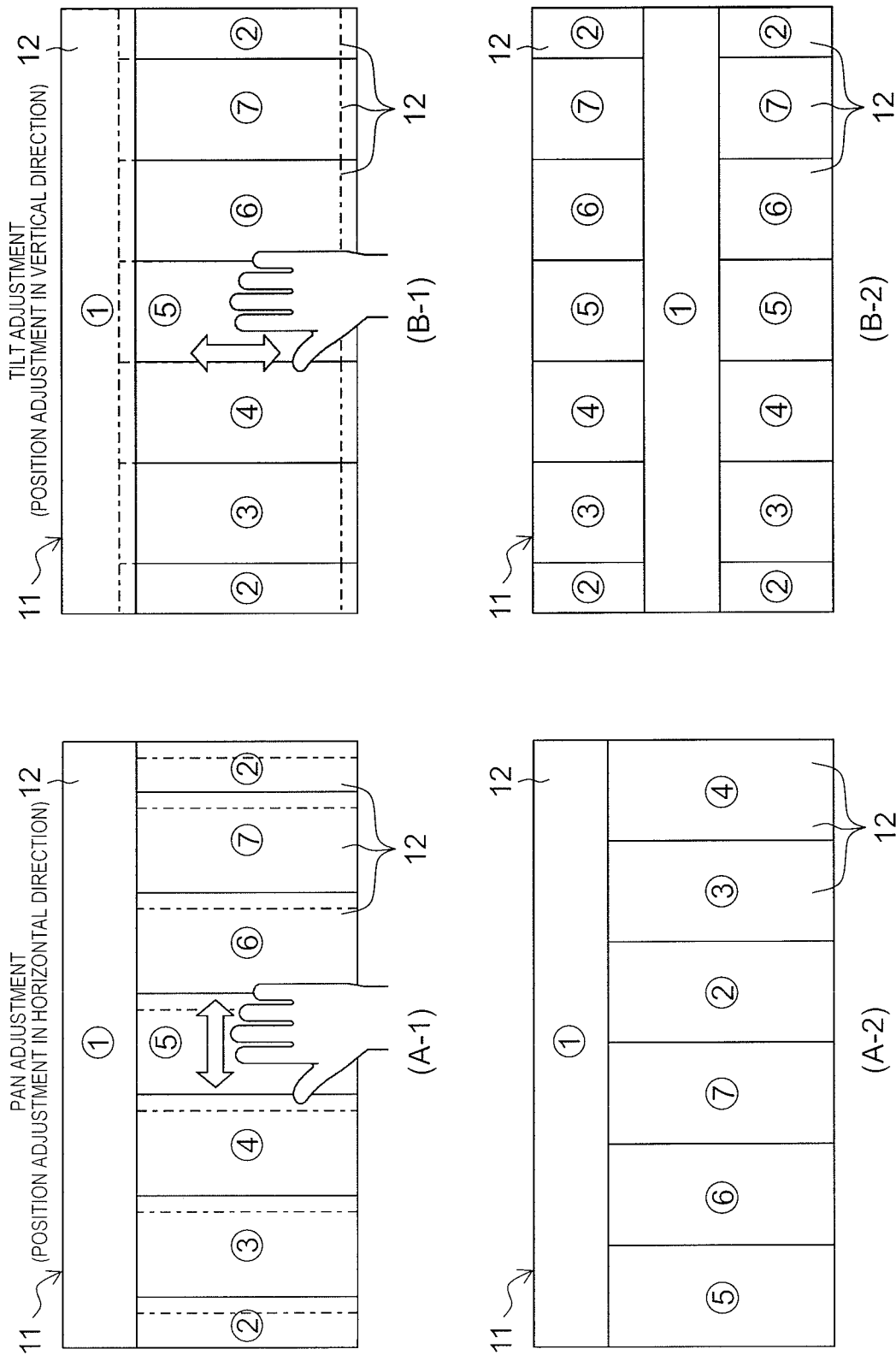

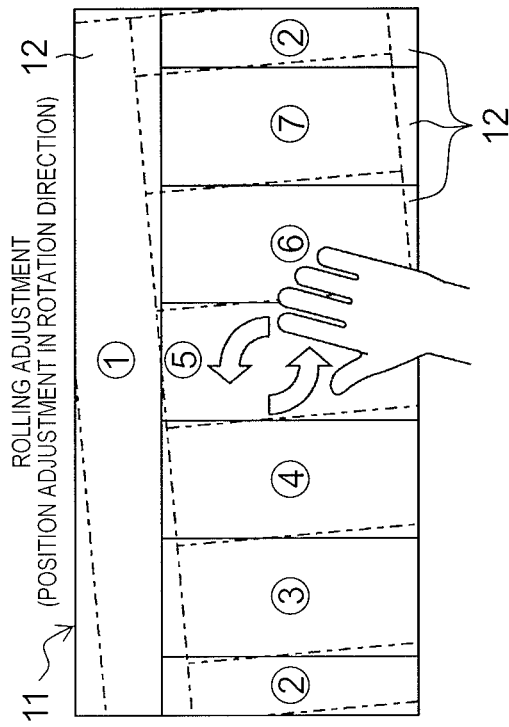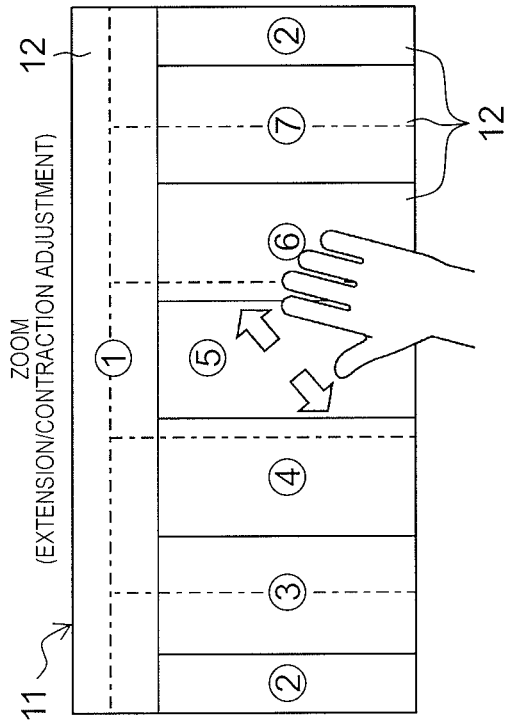

IMAGE PROCESSING DEVICE, IMAGING SYSTEM PROVIDED THEREWITH, AND CALIBRATION METHOD

TECHNICAL FIELD

The present disclosure relates to an image processing device that outputs a composite image by performing an image composition process on an image for each of a plurality of cameras, an imaging system provided therewith, and a calibration method of securing consistency between camera image regions in the composite image.

BACKGROUND ART

By performing a so-called stitching process of generating one composite image by compositing images captured by a plurality of cameras, a wide-angle image which cannot be obtained by one camera can be generated. In the stitching process, two adjacent cameras are arranged so that respective imaging areas of the cameras partially overlap with each other and image regions of boundary portions corresponding to overlapping portions of the imaging areas of the two cameras are superimposed or trimming is appropriately performed on the image regions to composite the images.

On the other hand, when subjects with different distances from the camera exist, that is, the subject of distant view and the subject of close-range view exist in the overlapping portion of the imaging areas of the two cameras, a positional relationship of an image of the subject of distant view and an image of the subject of close-range view deviates, so-called a disparity occurs, the image of the subject of distant view duplicately appears, and a defect of losing a part of the image of the subject of distant view occurs between the respective captured images of the two cameras. Therefore, in the stitching, disparity correction for suppressing the image defect caused by the disparity is performed.

Regarding the disparity correction, there is known a technique of obtaining the positional relationship between the images of the subjects which appear in the respective captured images of the two cameras by block matching based on edges and feature amounts and performing the disparity correction for deforming the image based on the information (see PTL 1). Specifically, in the technique, a stitching point which defines a deformation degree of the image during the disparity correction is changed for each of frames so as to appropriately generate a composite image for each of the frames.

Meanwhile, in a camera unit in which the plurality of cameras are mounted, when assembling an optical system constituting the camera, an error occurs in a mechanical disposition of positions, angles, and the like. This error of the mechanical disposition causes a state in which the image regions of the respective cameras are not appropriately consistent in the composite image obtained by the image composition process and causes deterioration of a quality of the composite image.

On the other hand, it is difficult for a user to adjust the mechanical disposition itself after product shipment. In addition, the error of the mechanical disposition is changed by a difference in an installation environment and is also changed as time passes. Therefore, by changing a processing condition of the image process, calibration of ensuring consistency between the camera image regions in the composite image is performed, and in particular, a technique which allows the user to conveniently perform adjustment work for the calibration at an appropriate timing such as immediately before photographing is desired.

The present disclosure enables the user to conveniently perform the adjustment work for the calibration of ensuring the consistency between the camera image regions in the composite image.

CITATION LIST

Patent Literature

PTL 1: Japanese Patent Unexamined Publication No. 2010-50842

SUMMARY OF THE INVENTION

According to the present disclosure, there is provided an image processing device that outputs a composite image by performing an image composition process on an image for each of a plurality of cameras, the device including: an image processing unit that generates a plurality of composition source images from each of captured images for each of the cameras based on a preset processing condition and performs the image composition process on the plurality of composition source images to generate a composite image for preview; a screen generation unit that generates a preview display screen on which the composite image for preview is displayed and outputs the preview display screen to a display input device; a touch operation determination unit that determines a camera image region to be adjusted in the composite image for preview based on a detection result of a touch operation which a user performs on the preview display screen displayed on the display input device and determines an adjustment item according to an operation mode of the touch operation; and a processing condition setting unit that sets a temporary processing condition related to the camera image region to be adjusted based on a determination result of the touch operation determination unit, in which the image processing unit generates the composition source image from the captured image of the camera corresponding to the camera image region to be adjusted based on the temporary processing condition and updates the composite image for preview by performing the image composition process on the composition source image.

In addition, an imaging system according to the present disclosure includes the image processing device, the plurality of cameras, and the display input device.

In addition, according to the present disclosure, there is provided a calibration method of securing consistency between camera image regions in a composite image generated by performing an image composition process on an image for each of a plurality of cameras, the method including: generating a plurality of composition source images from each of captured images for each of the cameras based on a preset processing condition and performing the image composition process on the plurality of composition source images to generate a composite image for preview; generating a preview display screen on which the composite image for preview is displayed and outputting the preview display screen to a display input device; determining the camera image region to be adjusted in the composite image for preview based on a detection result of a touch operation which a user performs on the preview display screen displayed on the display input device and determining an adjustment item according to an operation mode of the touch operation; setting a temporary processing condition related to the camera image region to be adjusted based on a determination result; and generating the composition source image from the captured image of the camera corresponding to the image region to be adjusted based on the temporary processing condition and updating the composite image for preview by performing the image composition process on the composition source image.

According to the present disclosure, it is possible to execute calibration of ensuring the consistency between the camera image regions in the composite image by the user performing the touch operation on the preview display screen displayed on the display input device. Accordingly, it is possible for the user to conveniently perform adjustment work for the calibration by an intuitive operation.

BRIEF DESCRIPTION OF DRAWINGS

FIG. 7 is an explanatory diagram illustrating a list of adjustment items according to an operation mode of a touch operation.

FIGS. 8A-8D are explanatory diagrams illustrating the touch operation in a case of individually adjusting each of camera image regions 12 of horizontal cameras 1.

FIG. 9 is an explanatory diagram illustrating the touch operation in a case of individually adjusting camera image regions 12 of upward cameras 1.

FIG. 10 is an explanatory diagram illustrating the touch operation in a case of integrally adjusting all of camera image regions 12.

FIGS. 11A and 11B are explanatory diagrams illustrating the touch operation in a case of integrally adjusting all of camera image regions 12.

DESCRIPTION OF EMBODIMENTS

Hereinafter, embodiments of the present disclosure will be described with reference to drawings.

Figure 1:
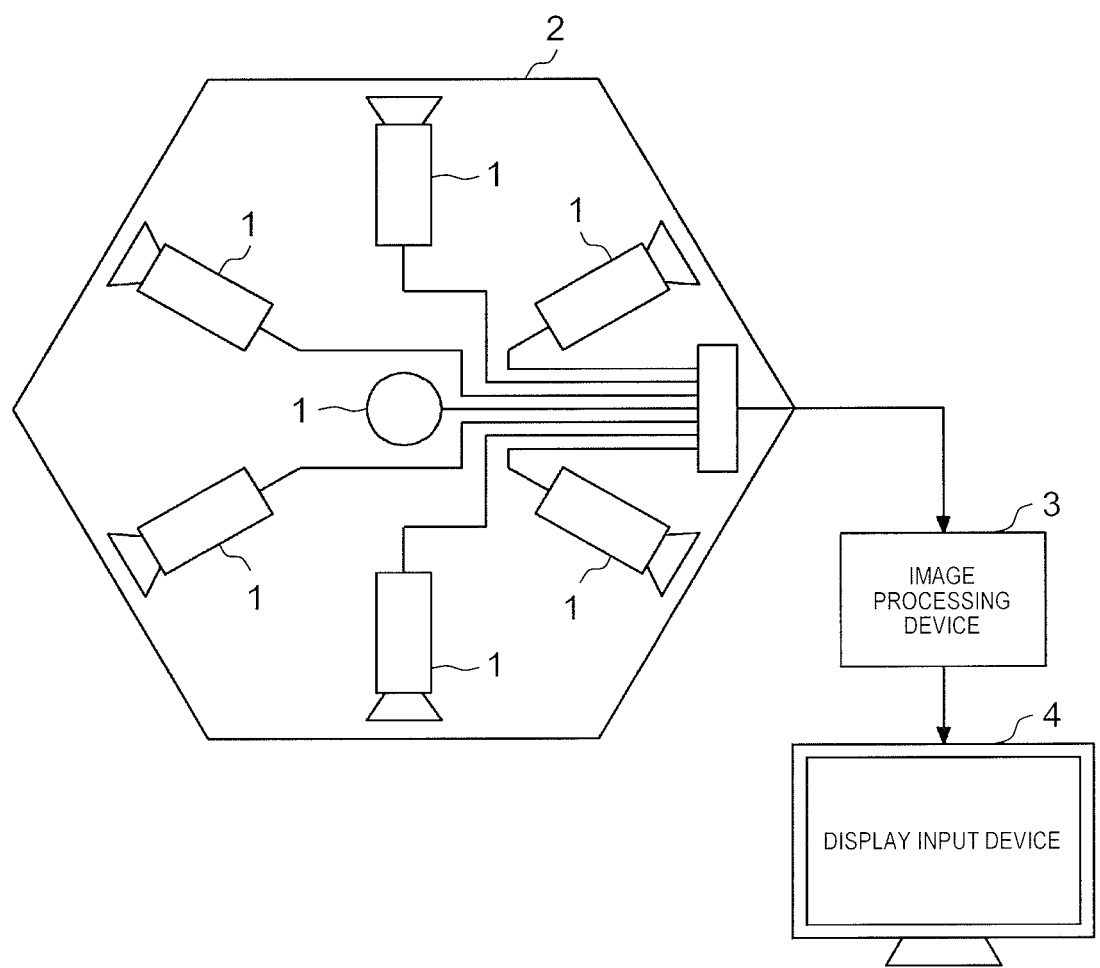
FIG. 1 is an overall configuration diagram of an imaging system according to the present embodiment.
Figure 2:
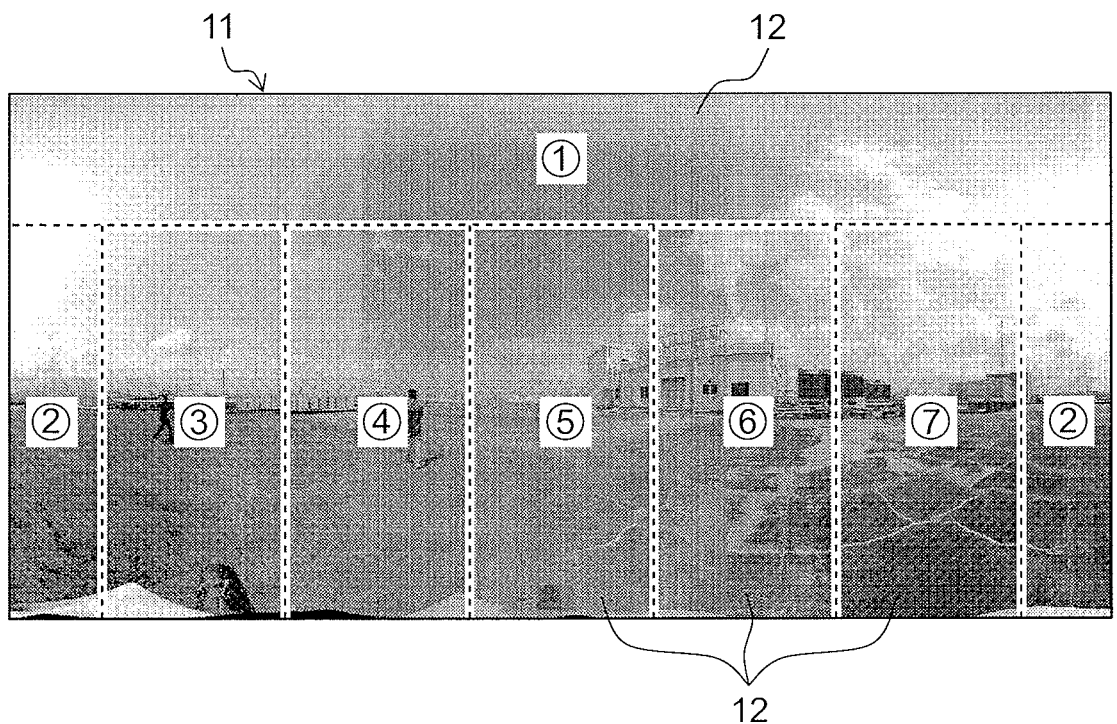
FIG. 2 is an explanatory diagram illustrating a composite image generated by image processing device 3 and displayed on display input device 4.

FIG. 1 is an overall configuration diagram of an imaging system according to the present embodiment. FIG. 2 is an explanatory diagram illustrating a composite image generated by an image processing device 3 and displayed on a display input device 4.

As illustrated in FIG. 1, the present imaging system includes camera unit 2 having a plurality of cameras 1, image processing device 3, and display input device 4.

Seven cameras 1 of one upward camera 1 which is disposed so that an optical axis is upward in an approximately vertical direction and six horizontal cameras 1 which are arranged at equal intervals in a circumferential direction so that an optical axis is radial in an approximately horizontal direction are mounted on camera unit 2. Each of cameras 1 has a wide angle of view (for example, 120°) and is arranged so that two imaging areas adjacent to each other partially overlap with each other.

As illustrated in FIG. 2, image processing device 3 performs a stitching process of compositing captured images captured by each of cameras 1 to generate one composite image 11. Composite image 11 is in a state in which camera image regions 12 are combined based on each of captured images captured by each of cameras 1. In addition, the stitching process is performed on each of frames, a composite image of each of the frames is output to display input device 4, and the composite images are displayed on display input device 4 as a video.

In the present embodiment, image processing device 3 generates the composite image in real time and outputs the composite image to display input device 4 so that a user can see the composite image in real time, but the composite image generated by image processing device 3 may be stored in an information storage unit included in image processing device 3 or an information storage device connected to image processing device 3.

Display input device 4 is a so-called touch panel display which combines a display panel (display device) and a touch panel (position input device). Display input device 4 displays a screen of the composite image output from image processing device 3 and the user performs a touch operation on the screen so that it is possible to variously adjust each of camera image regions 12 in the composite image.

Here, in camera unit 2, when assembling an optical system constituting camera 1 or when assembling camera 1 itself as a base, an error occurs in a mechanical disposition of positions, angles, and the like. This error of the mechanical disposition causes a state in which each of camera image regions 12 is not appropriately consistent in the composite image obtained by an image composition process and causes deterioration of a quality of the composite image.

In the present embodiment, by changing a processing condition of the image process performed by image processing device 3 as calibration for securing consistency between camera image regions 12 in the composite image, the user adjusts a position, an angle, and a size of camera image region 12 so that stitching portions between adjacent camera image regions 12 in composite image 11 are approximately matched.

In addition, in composite image 11, in some cases, tone and brightness may be different at portions where the tones and the brightness should be originally matched in different camera image regions 12. Here, in the present embodiment, by changing an imaging condition of camera 1 as calibration for securing consistency between camera image regions 12 in the composite image, the user adjusts the tone and the brightness of camera image regions 12.

In addition, adjustment work for calibration of ensuring the consistency between camera image regions 12 in the composite image is performed by the touch operation of display input device 4 and the calibration is executed by performing a predetermined touch operation on camera image region 12 which is a defect.

Figure 3:
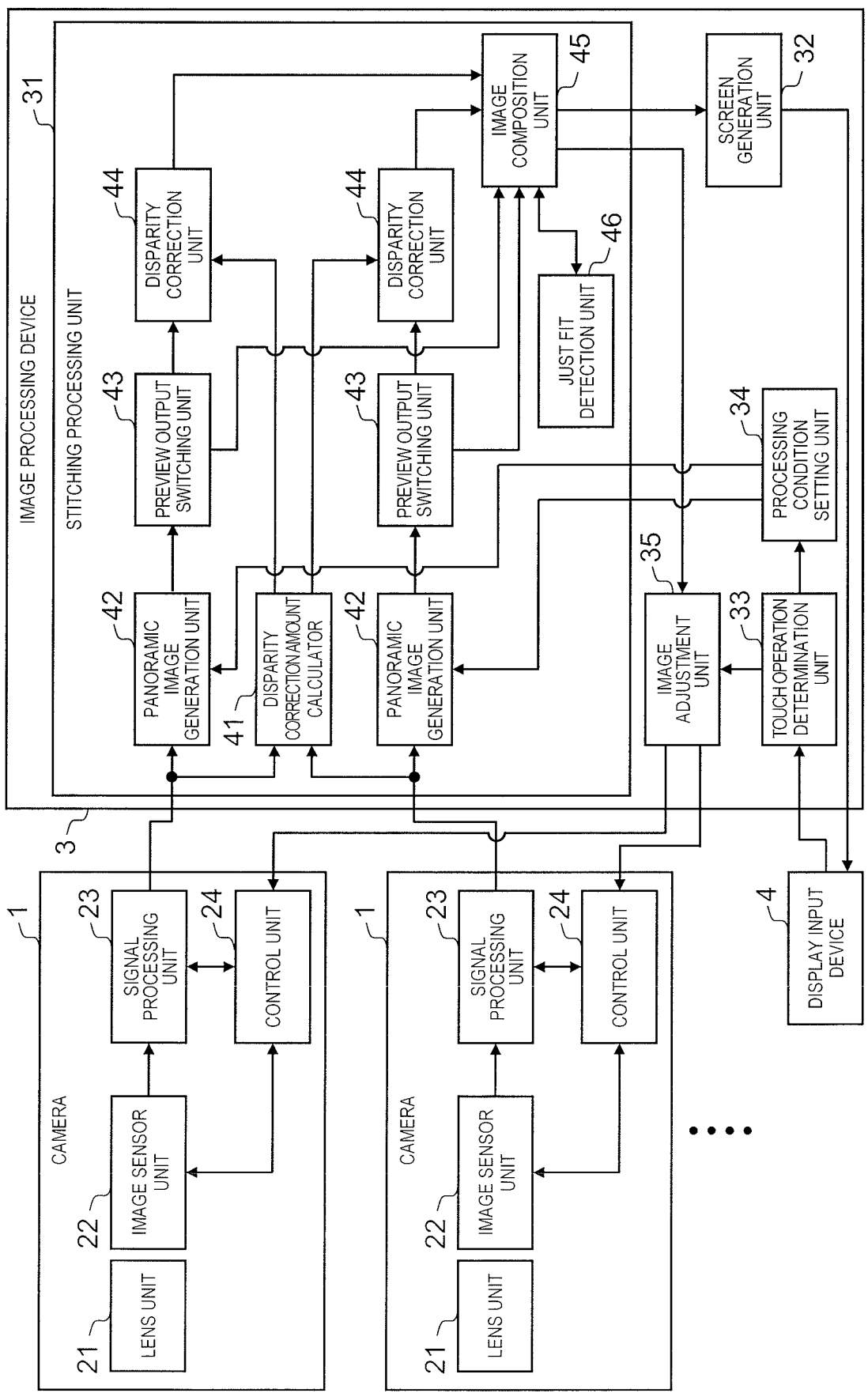
FIG. 3 is a functional block diagram illustrating a schematic configuration of image processing device 3.
Figure 4:
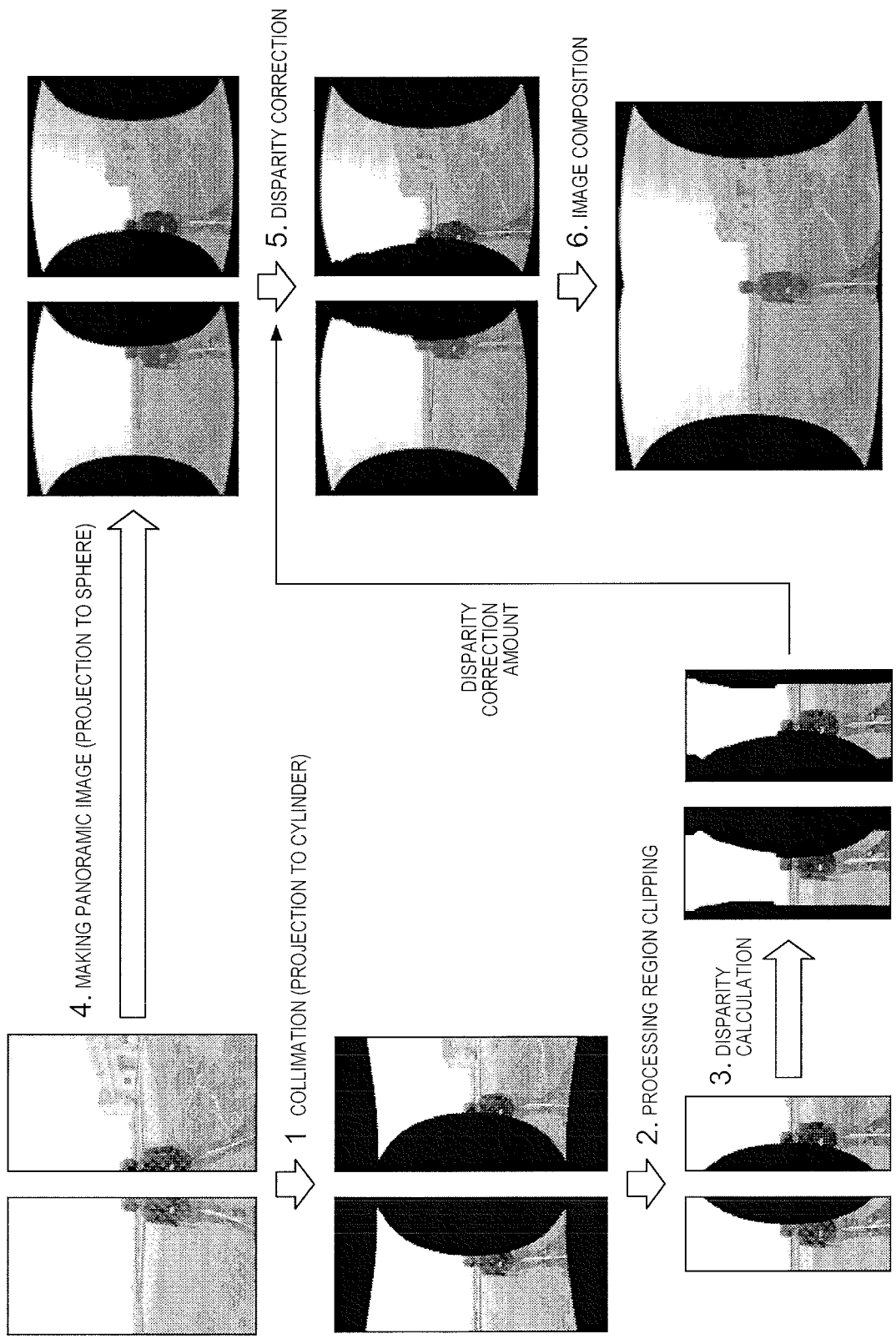
FIG. 4 is an explanatory diagram illustrating an outline of a stitching process performed by image processing device 3.

Next, a schematic configuration of image processing device 3 will be described. FIG. 3 is a functional block diagram illustrating the schematic configuration of image processing device 3. FIG. 4 is an explanatory diagram illustrating an outline of the stitching process performed by image processing device 3.

Camera 1 includes lens unit 21, image sensor unit 22, signal processing unit 23, and control unit 24.

Image sensor unit 22 images a subject via lens unit 21 and outputs an image signal. Signal processing unit 23 executes a necessary signal process on the image signal output from image sensor unit 22 and outputs a captured image. Control unit 24 controls operations of image sensor unit 22 and signal processing unit 23.

Image processing device 3 includes stitching processing unit (image processing unit) 31, screen generation unit 32, touch operation determination unit 33, processing condition setting unit 34, and image adjustment unit 35. Stitching processing unit 31 includes disparity correction amount calculator 41, panoramic image generation unit 42, preview output switching unit 43, disparity correction unit 44, image composition unit 45, and just fit detection unit 46.

Here, only a portion of processing the captured images of two cameras 1 is described. As illustrated in FIG. 1, in the present embodiment, the seven cameras 1 are provided. Disparity correction amount calculator 41 is provided for each of combinations of the two adjacent cameras 1 and panoramic image generation unit 42, preview output switching unit 43, and disparity correction unit 44 are provided for each of cameras 1.

Disparity correction amount calculator 41 calculates the disparity correction amount which defines a deformation degree of the image during disparity correction for each of the frames. Specifically, as illustrated in FIG. 4, each of processes of collimation (projection to cylinder), processing region clipping, and disparity calculation is performed. In the disparity calculation, disparity (deviation amount) is calculated by block matching between the two captured images. That is, while shifting the two captured images little by little, a difference between the two captured images is calculated and the disparity is calculated from a positional relationship at which the difference is the smallest.

Panoramic image generation unit 42 makes the captured images respectively output from cameras 1 to be panoramic images (projection to sphere) and generates the panoramic image (composition source image). First, panoramic image generation unit 42 generates the panoramic image based on the preset control parameter (processing condition). When processing condition setting unit 34 sets a temporary control parameter according to the touch operation of the user, panoramic image generation unit 42 generates the panoramic image based on the temporary control parameter.

Preview output switching unit 43 normally outputs the panoramic image generated by panoramic image generation unit 42 to disparity correction unit 44 and outputs the panoramic image generated by panoramic image generation unit 42 to image composition unit 45 when displaying a preview display screen. Accordingly, when displaying the preview display screen, the image composition process is performed without a disparity correction process.

Disparity correction unit 44 performs the disparity correction on the panoramic image generated by panoramic image generation unit 42 based on the disparity correction amount output from disparity correction amount calculator 41 to generate a disparity correction image.

Image composition unit 45 normally performs the image composition process on a plurality of disparity correction images generated by disparity correction unit 44 to generate the composite image. In addition, when displaying the preview display screen, image composition unit 45 performs the image composition process on a plurality of panoramic images generated by panoramic image generation unit 42 to generate the composite image for preview. The composite image for preview is normally lower in resolution than the composite image.

When displaying the preview display screen, since only camera image region 12 to be adjusted is changed according to the touch operation, it is possible to generate a new composite image by superimposing camera image region 12 to be adjusted on the original composite image.

Just fit detection unit 46 detects a just fit state in which consistency of the stitching portion between camera image region 12 to be adjusted and adjacent camera image region 12 in the composite image is high.

Here, in order to detect the just fit state, an absolute value of a difference between pixel values is obtained between pixels positioned at the stitching portion of adjacent camera image regions 12, that is, the pixels adjacent to each other across a boundary line of camera image region 12, the absolute values of the differences are added, and a sum of the absolute values of the differences are calculated. Then, based on a magnitude of the sum of the absolute values of the differences, a degree (error) of positional deviation of adjacent camera image regions 12 is determined and when the sum of the absolute values of the differences becomes a minimum value in the vicinity, the just fit state is determined.

When just fit detection unit 46 detects the just fit state in this way, the composite images at those timings are continuously output within a predetermined range. Accordingly, on the preview display screen, camera image region 12 to be adjusted is displayed in a stationary state within the predetermined range without interlocking with the touch operation.

Screen generation unit 32 normally generates a regular display screen on which the composite image generated by image composition unit 45 performing the image composition process on the disparity correction image is displayed and outputs the regular display screen to display input device 4. In addition, screen generation unit 32 generates the preview display screen on which the composite image for preview generated by image composition unit 45 performing the image composition process on the panoramic image is displayed and outputs the preview display screen to display input device 4.

Touch operation determination unit 33 obtains a detection result of the touch operation which the user performs on the preview display screen displayed on display input device 4, from display input device 4. Based on the detection result of the touch operation, touch operation determination unit 33 determines camera image region 12 to be adjusted in composite image 11 and determines an adjustment item (pan adjustment, tilt adjustment, rolling adjustment, and zoom adjustment) according to an operation mode of the touch operation.

In the present embodiment, in a case where the touch operation is performed with one or two fingers, one camera image region 12 on which the touch operation is performed is set as an adjustment target and an individual adjustment of individually adjusting each of camera image regions 12 is performed. In addition, in a case where the touch operation is performed with three or more fingers, all of camera image regions 12 are set as the adjustment targets and an overall adjustment of integrally adjusting all of camera image regions 12 is performed.

Further, in a case where the operation mode of the touch operation is a touch operation for different camera image regions 12 with two fingers, two camera image regions 12 on which the touch operation is performed are set as the adjustment targets and it is determined that an image adjustment is performed between two camera image regions 12.

Based on a determination result of touch operation determination unit 33, processing condition setting unit 34 sets a temporary processing condition related to camera image region 12 to be adjusted. In the present embodiment, as the processing condition, the control parameter related to generation of the panoramic image (composition source image) by panoramic image generation unit 42 is set.

When processing condition setting unit 34 sets the temporary processing condition, based on the temporary processing condition, stitching processing unit 31 generates the composition source image from the captured image of camera 1 corresponding to camera image region 12 to be adjusted and updates the composite image for preview by performing the image composition process on the composition source image.

Image adjustment unit 35 performs the image adjustment between two camera image regions 12. In the present embodiment, the image adjustment is performed so that at least either tones or brightness in touch regions in two camera image regions 12 is matched. The image adjustment is executed in a case where the operation mode of the touch operation is a touch operation for different camera image regions 12 with two fingers.

In addition, in the present embodiment, the imaging condition of camera 1, that is, the control parameter related to tones and brightness is set so that the tones and the brightness in two camera image regions 12 are matched. The control parameter is output from image adjustment unit 35 to control unit 24 of camera 1 and control unit 24 controls image sensor unit 22 and signal processing unit 23 based on the control parameter.

Image processing device 3 illustrated in FIG. 3 is configured by a general-purpose information processing device. Each of units of image processing device 3 can be realized by causing a processor to execute a program for the image process stored in a memory. In addition, at least a part of image processing device 3 also can be realized by an exclusive hardware (screen processing circuit) for screen processing.

Figure 5:
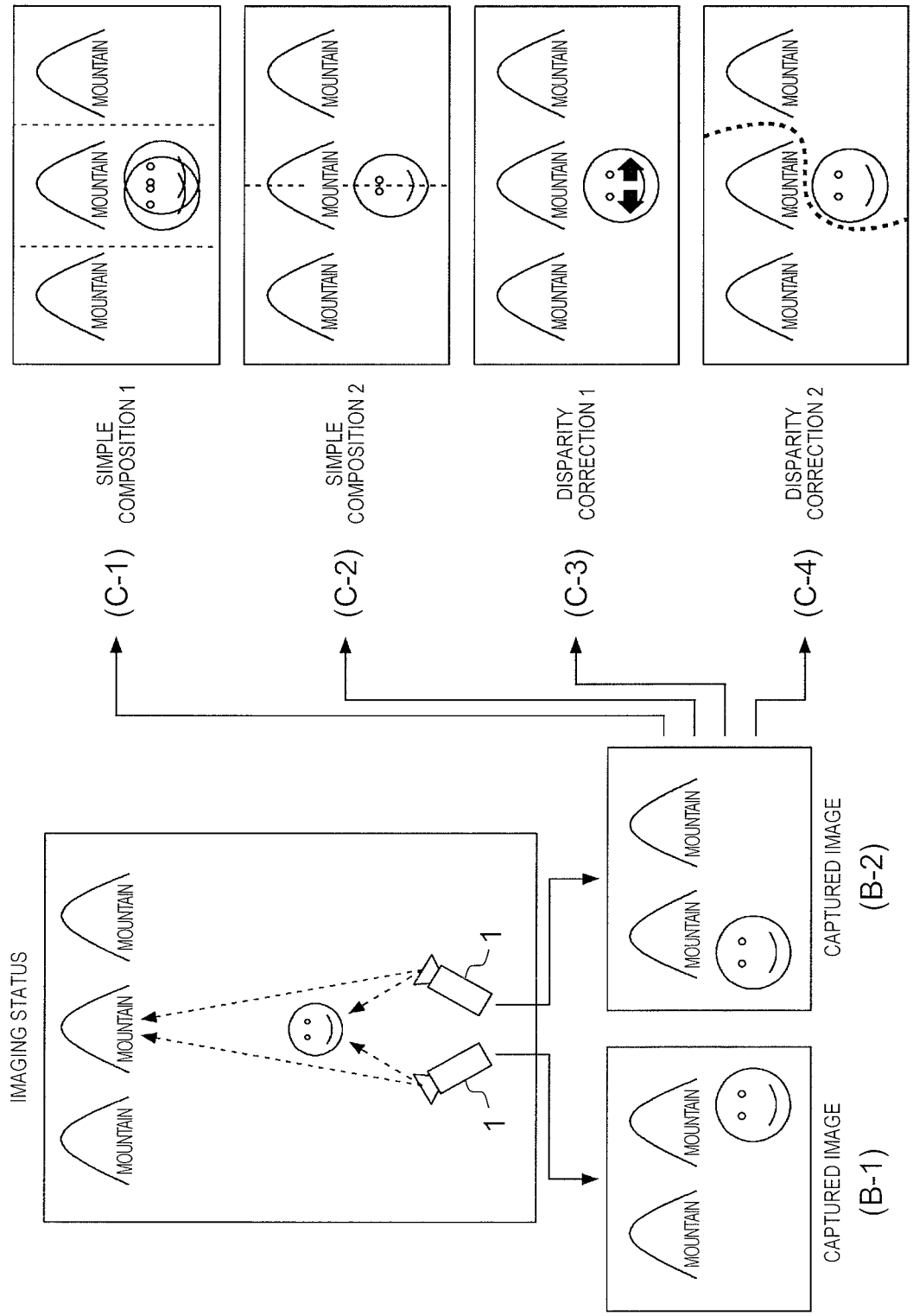
FIG. 5 is an explanatory diagram schematically illustrating states of an image in a case where disparity correction is not executed and a case where the disparity correction is executed.
Figure 6A:
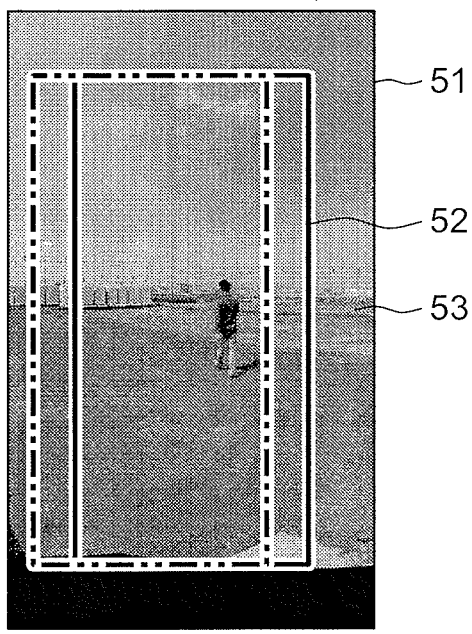
FIGS. 6A-6D illustrate an art of adjusting camera image regions 12.
Figure 6B:
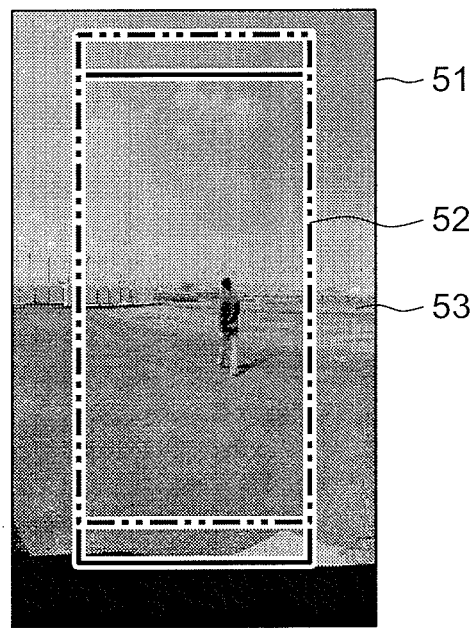
Figure 6C:
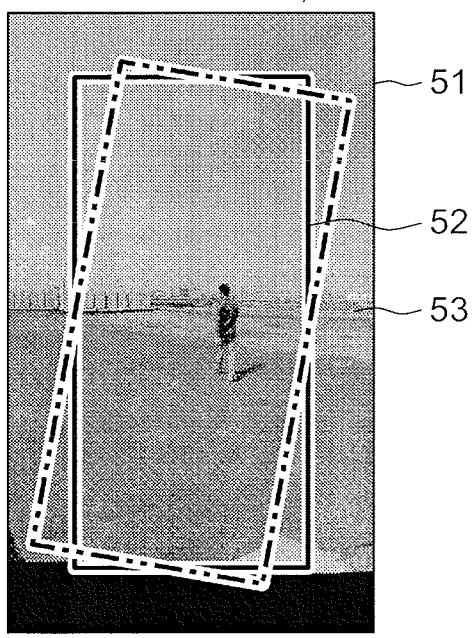
Figure 6D:
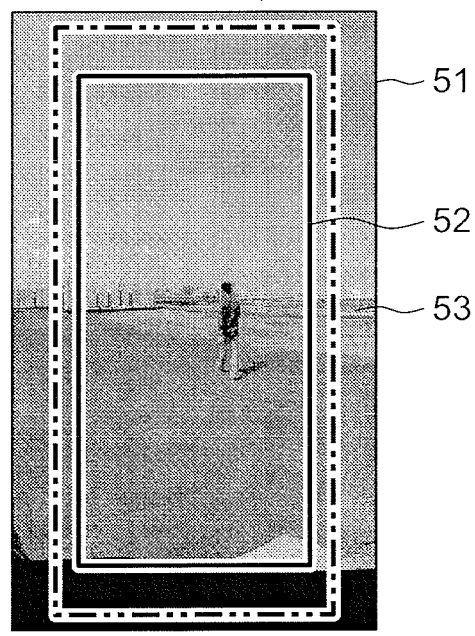

Next, the disparity correction performed by disparity correction unit 44 will be described. FIG. 5 is an explanatory diagram schematically illustrating states of an image in a case where the disparity correction is not executed and a case where the disparity correction is executed. Here, for convenience of explanation, an example of processing the images of two adjacent cameras 1 will be described.

(A) of FIG. 5 illustrates imaging status by two adjacent cameras 1. In an example illustrated in (A) of FIG. 5, a person and a mountain which is a background are simultaneously imaged by two cameras 1.

(B-1) and (B-2) in FIG. 5 illustrate images captured by two cameras 1. As illustrated in (B-1) and (B-2) of FIG. 5, in the captured image by two cameras 1, the image of distant view representing the mountain and the image of close-range view representing the person appear in image regions of boundary portions corresponding to an overlapping portion of the imaging areas of two cameras 1. Here, the mountain of distant view and the person of close-range view have different distances from camera 1, so that in the two captured images, a positional relationship between the image of distant view and the image of close-range view deviates.

(C-1) and (C-2) in FIG. 5 illustrate composite images obtained by performing simple composite on the images captured by two cameras 1 based on the image of distant view. As described above, since the positional relationship between the image of distant view and the image of close-range view deviates in the two captured images, when the two captured images are simply composited based on the image of distant view, as illustrated in (C-1) and (C-2) of FIG. 5, a defect of duplicately appearing the image of close-range view or of losing a part of the image of close-range view occurs in the composite image.

Here, a deviation of the image of close-range view when setting the image of distant view as a standard means a disparity between the captured images of two cameras 1. The positional relationship between the images of distant view respectively captured by two cameras 1 can be obtained in advance in a state in which the image of close-range view does not exist and the images are composited based on the information. On the other hand, when the image of close-range view does not exist, the disparity does not exist in the captured images of two cameras 1 and when the image of close-range view exists, the disparity between the captured images of two cameras 1 exists.

Therefore, in a state in which the image of distant view and the image of close-range view appear in the image regions of the boundary portions in the captured images of two cameras 1, the disparity generated between the two captured images causes a defect like the image of close-range view duplicately appears in the composite image. Then, the disparity correction for removing the defect is necessary. There are representatively two types of correction methods for the disparity correction. (C-3) in FIG. 5 illustrates a first correction method and (C-4) in FIG. 5 illustrates a second correction method.

As illustrated in (C-3) of FIG. 5, in the first correction method, the image is deformed so that the image region in which the image of close-range view mainly appears is horizontally shifted, and then, the captured images of two cameras 1 are composited so as to consist the positional relationship of the image of distant view and the image of close-range view between the captured images of two cameras 1.

As illustrated in (C-4) of FIG. 5, in the second correction method, a curved stitching boundary is set so as to avoid the image region in which the image of close-range view appears. After trimming is performed to clip the captured images of two cameras 1 along the stitching boundary, the images are composited.

In this way, by performing the disparity correction, it is possible to generate the appropriate image. In the present embodiment, the first correction method, that is, the disparity correction of deforming the image to horizontally shift the image region in which the image of close-range view mainly appears is performed on the captured images of two cameras 1 so that the positional relationship of the image of distant view and the image of close-range view between the captured images of two cameras 1 consists.

Next, an art of adjusting camera image regions 12 will be described. FIG. 6 is an explanatory diagram illustrating the art of adjusting camera image regions 12.

In the present embodiment, when displaying the preview display screen, panoramic image generation unit 42 makes the captured images obtained from cameras 1 to be the panoramic image (projection to sphere) and generates the panoramic image (composition source image). Then, the images are composited by clipping a necessary region from the panoramic image. At this time, a position and a size of each of camera image regions 12 on composite image 11 are defined according to a projection position (central position of projection region) and a projection size (size of projection region) during making the panoramic image.

On the other hand, by each of cameras 1 imaging the subject with a wide angle, in captured image 51, blank region 53 is formed outside used region 52 corresponding to camera image region 12 finally displayed on the composite image. It is possible to adjust the projection position and the projection size during making the panoramic image within a range of blank region 53.

Here, in the present embodiment, it is possible to perform the pan adjustment, tilt adjustment, rolling adjustment, and zoom adjustment by the touch operation.

As illustrated in (A) of FIG. 6, in the pan adjustment (position adjustment in horizontal direction), camera image region 12 can be moved in the horizontal direction and at this time, a process of adjusting the projection position of the image in the horizontal direction is performed. As illustrated in (B) of FIG. 6, in the tilt adjustment (position adjustment in vertical direction), camera image region 12 can be moved in the vertical direction and at this time, a process of adjusting the projection position of the image in the vertical direction is performed. As illustrated in (C) of FIG. 6, in the rolling adjustment (position adjustment in rotation direction), camera image region 12 can be rotated and at this time, a process of adjusting the projection position of the image in the rotation direction is performed. As illustrated in (D) of FIG. 6, in the zoom adjustment (extension/contraction adjustment), camera image region 12 can be zoomed out or zoomed in and at this time, a process of adjusting the size of the image is performed.

In addition, in the present embodiment, processing condition setting unit 34 sets a setting value related to the projection position and the projection size as the control parameter related to generation of the panoramic image (composition source image) according to the touch operation. Based on the control parameter, panoramic image generation unit 42 adjusts the projection position and the projection size during making the panoramic image.

Here, regarding each of camera image regions 12, the control parameter related to each of the adjustment items of the pan adjustment, the tilt adjustment, the rolling adjustment, and the zoom adjustment is preset. When the touch operation related to one of the pan adjustment, the tilt adjustment, the rolling adjustment, and the zoom adjustment is performed, the control parameter related to the adjustment item corresponding to camera image region 12 to be adjusted is updated.

Next, the adjustment item according to the operation mode of the touch operation will be described. FIG. 7 is an explanatory diagram illustrating a list of the adjustment items according to the operation mode of the touch operation.

In the present embodiment, in a case where the touch operation is performed with one or two fingers, one camera image region 12 on which the touch operation is performed is set as an adjustment target and an individual adjustment of individually adjusting each of camera image regions 12 can be performed. In addition, in a case where the touch operation is performed with three or more fingers, all of camera image regions 12 are set as the adjustment targets and an overall adjustment of integrally adjusting all of camera image regions 12 can be performed.

In addition, in the present embodiment, the pan adjustment (position adjustment in horizontal direction) of horizontally moving camera image region 12 to be adjusted, the tilt adjustment (position adjustment in vertical direction) of vertically moving camera image region 12 to be adjusted, the rolling adjustment (position adjustment in rotation direction) of rotating camera image region 12 to be adjusted, and the zoom adjustment (extension/contraction adjustment) of zooming in or zooming out camera image region 12 to be adjusted can be performed.

Hereinafter, the adjustment item according to the operation mode of the touch operation will be described in detail.

First, a case where each of camera image regions 12 is individually adjusted will be described. FIG. 8 is an explanatory diagram illustrating the touch operation in a case of individually adjusting each of camera image regions 12 of horizontal cameras 1. FIG. 9 is an explanatory diagram illustrating the touch operation in a case of individually adjusting camera image regions 12 of upward cameras 1.

In the present embodiment, in a case where the touch operation is performed with one or two fingers, one camera image region 12 on which the touch operation is performed is set as an adjustment target and it is possible to individually adjust each of camera image regions 12.

First, in a case of camera image region 12 related to horizontal camera 1, as illustrated in (A) of FIG. 8, it is possible to perform the pan adjustment (position adjustment in horizontal direction) of horizontally moving camera image region 12 to be operated by a swipe operation of sliding one finger touched on the screen in the horizontal direction (left and right direction of screen).

In addition, as illustrated in (B) of FIG. 8, it is possible to perform the tilt adjustment (position adjustment in vertical direction) of vertically moving camera image region 12 to be operated by a swipe operation of sliding one finger touched on the screen in the vertical direction (up and down direction of screen).

In addition, as illustrated in (C) of FIG. 8, it is possible to perform the rolling adjustment (position adjustment in rotation direction) of rotating camera image region 12 to be operated by a rotation operation of moving two fingers touched on the screen to draw a circle.

In addition, as illustrated in (D) of FIG. 8, it is possible to perform the zoom adjustment (extension/contraction adjustment) of zooming in or zooming out camera image region 12 to be operated by a pinch operation of moving two fingers touched on the screen to widen or narrow a gap between the two fingers.

On the other hand, in a case of camera image region 12 related to upward camera 1, as illustrated in (A-1) of FIG. 9, it is possible to move the image which appears in camera image region 12 in the horizontal direction by a swipe operation of sliding one finger touched on the screen in the horizontal direction (left and right direction of image).

Here, in camera image region 12 related to upward camera 1, a horizontal movement on composite image 11 corresponds to rotating of projection region 62 in a latitude line direction on projection sphere 61 as illustrated in (A-2) of FIG. 9. For this reason, when the horizontal swipe operation is performed, the rolling adjustment (position adjustment in rotation direction) of adjusting the projection position of the image in the rotation direction is performed.

In addition, as illustrated in (B-1) of FIG. 9, it is possible to move the image which appears in camera image region 12 in the vertical direction by a swipe operation of sliding one finger touched on the screen in the vertical direction (up and down direction of image).

Here, in camera image region 12 related to upward camera 1, a vertical movement on composite image 11 corresponds to moving of projection region 62 in a longitude line direction on projection sphere 61 as illustrated in (B-2) of FIG. 9. For this reason, when the vertical swipe operation is performed, the tilt adjustment (position adjustment in diameter direction) of adjusting the projection position of the image in the vertical direction is performed.

Next, a case of integrally adjusting all of camera image regions 12 will be described. FIGS. 10 and 11 are explanatory diagrams illustrating the touch operation in the case of integrally adjusting all of camera image regions 12.

In the present embodiment, in a case where the touch operation is performed with three or more fingers, all of camera image regions 12 are set as the adjustment targets and it is possible to integrally adjust all of camera image regions 12.

First, as illustrated in (A-1) of FIG. 10, it is possible to perform the pan adjustment (position adjustment in horizontal direction) of horizontally moving all of camera image regions 12 by a swipe operation of sliding three or more fingers touched on the screen in the horizontal direction (left and right direction of screen). At this time, according to the movement of camera image region 12 related to horizontal camera 1, the image which appears in camera image region 12 related to upward camera 1 moves in the horizontal direction.

In this case, by performing the swipe operation greatly, camera image region 12 related to horizontal camera 1 is displayed so as to be circulated. Accordingly, for example, in the state illustrated in (A-1) of FIG. 10, camera image region 12 positioned at a left or right end can be arranged at a center of the screen as illustrated in (A-2) of FIG. 10.

In addition, as illustrated in (B-1) of FIG. 10, it is possible to perform the tilt adjustment (position adjustment in vertical direction) of vertically moving all of camera image regions 12 by a swipe operation of sliding three or more fingers touched on the screen in the vertical direction (up and down direction of screen).

In this case, by performing the swipe operation greatly, camera image region 12 is displayed so as to be vertically circulated. Accordingly, for example, in the state illustrated in (B-1) of FIG. 10, camera image region 12 related to upward camera 1 positioned at an upper end can be arranged at a center of the screen as illustrated in (B-2) of FIG. 10. In this case, by sandwiching camera image region 12 related to upward camera 1, camera image region 12 related to upward camera 1 is displayed in a state in which camera image region 12 is divided into two.

In addition, as illustrated in (A) of FIG. 11, it is possible to perform the rolling adjustment (position adjustment in rotation direction) of rotating all of camera image regions 12 by a rotation operation of moving three or more fingers touched on the screen to draw a circle.

In addition, as illustrated in (B) of FIG. 11, it is possible to perform the zoom adjustment (extension/contraction adjustment) of zooming in or zooming out all of camera image regions 12 by the pinch operation of moving three or more fingers touched on the screen to widen or narrow a gap between three or more fingers.

Figure 12:
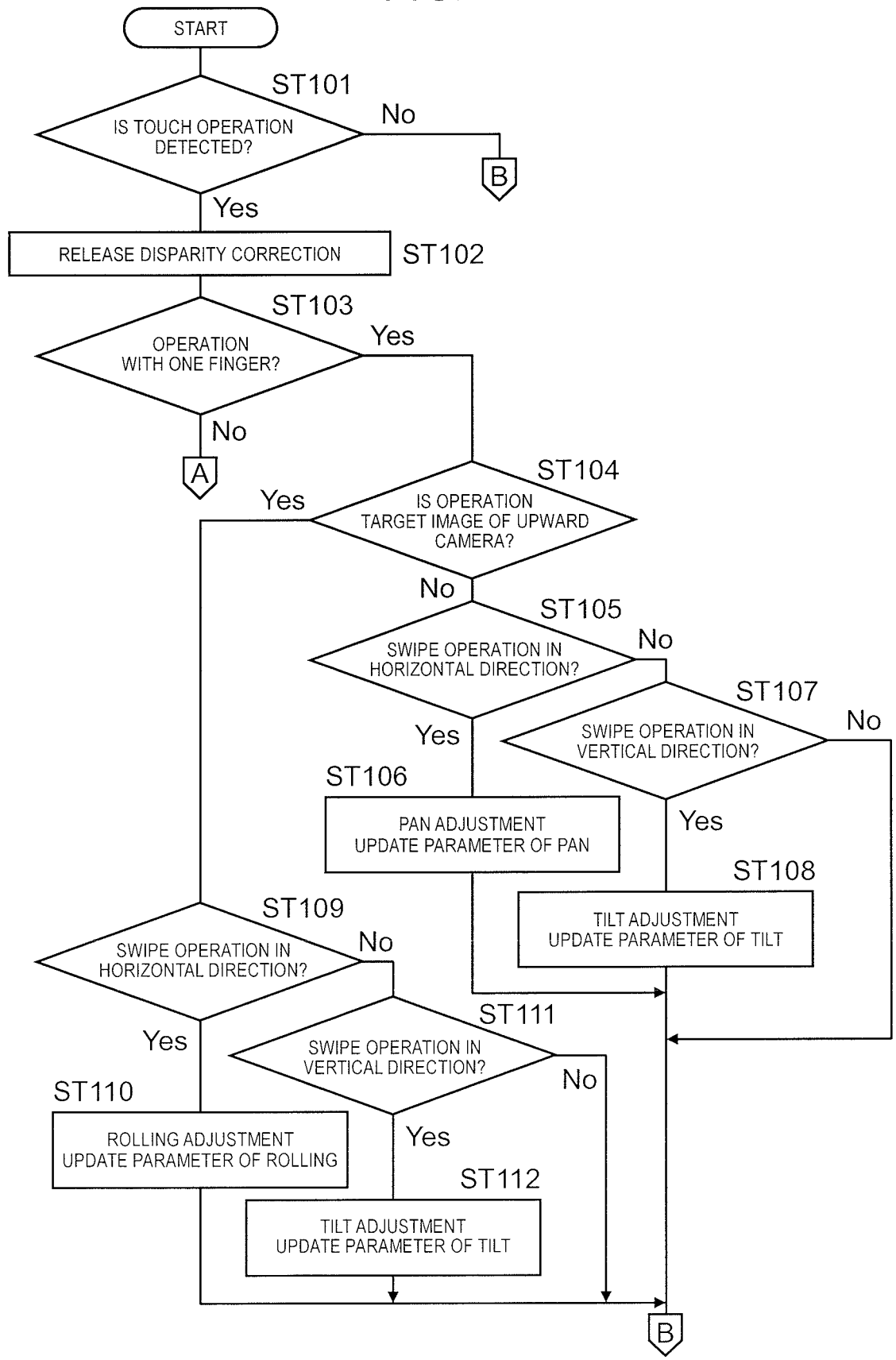
FIG. 12 is a flowchart illustrating a flow of a process executed by image processing device 3 according to the touch operation of a user.
Figure 13:
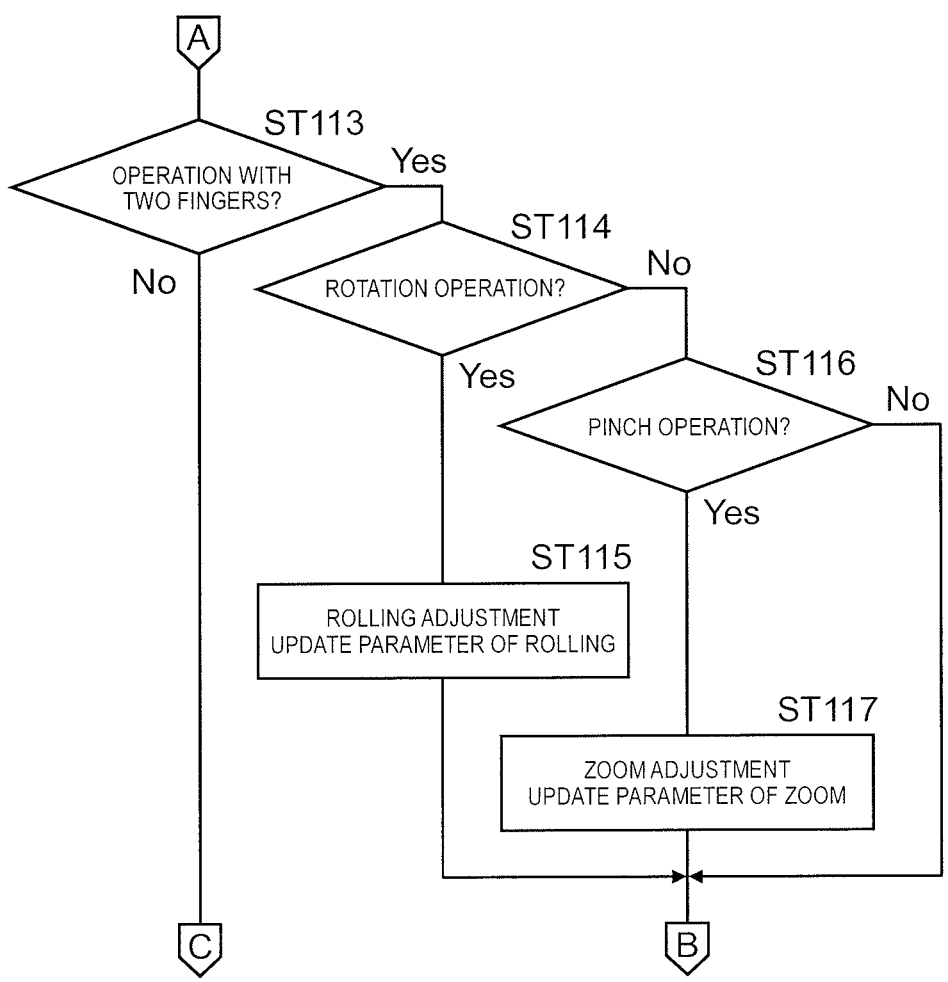
FIG. 13 is a flowchart illustrating a flow of a process executed by image processing device 3 according to the touch operation of the user.
Figure 14:
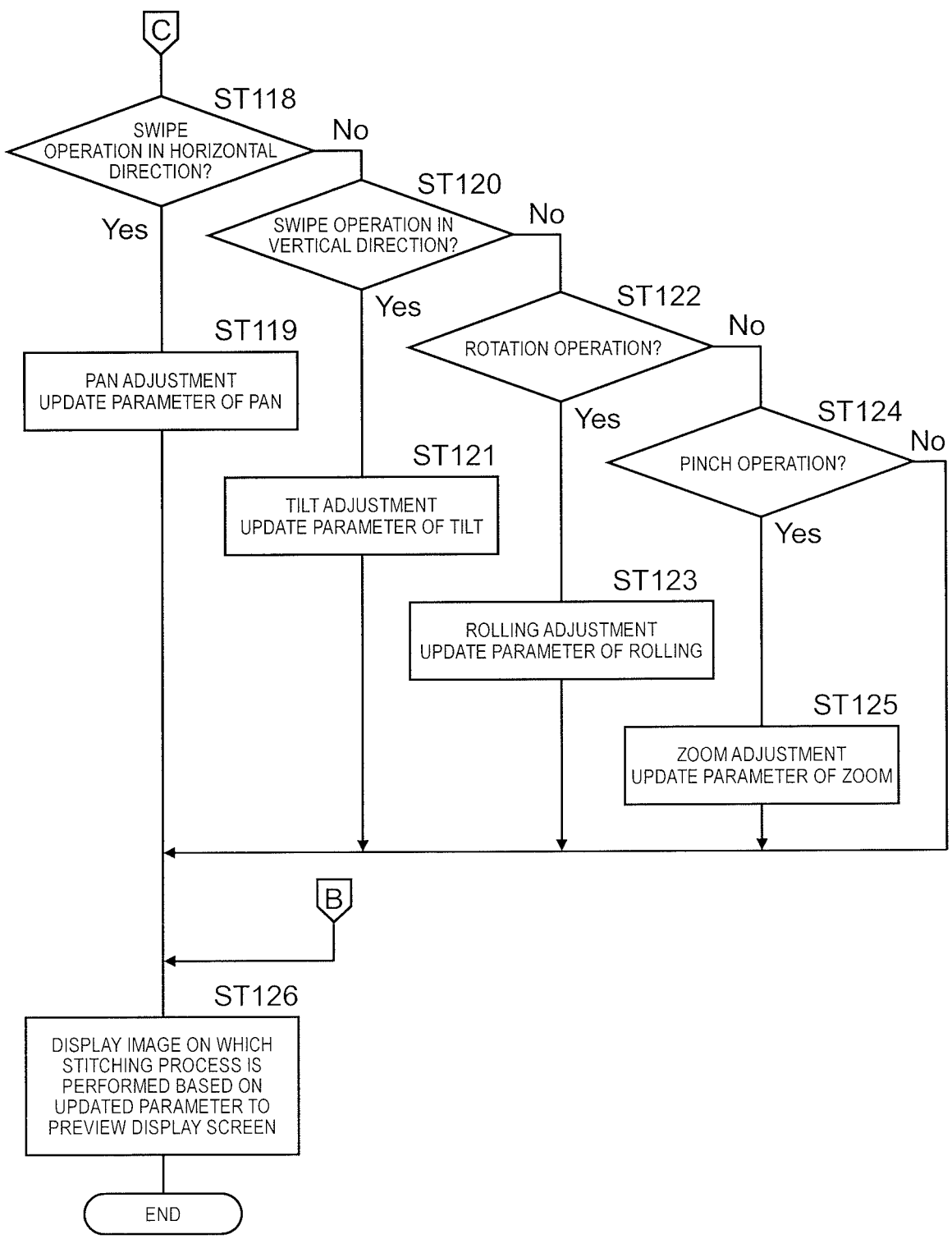
FIG. 14 is a flowchart illustrating a flow of a process executed by image processing device 3 according to the touch operation of the user.

Next, a flow of a process executed by image processing device 3 according to the touch operation of the user will be described. FIGS. 12, 13, and 14 are flowcharts illustrating the flow of the process executed by image processing device 3 according to the touch operation of the user.

First, touch operation determination unit 33 determines whether or not the touch operation is detected (ST 101). Here, in a case where the touch operation is detected (Yes in ST 101), the disparity correction is released (ST 102). Then, it is determined whether or not the touch operation is an operation with one finger (ST 103).

Here, in a case where the touch operation is the operation with one finger (Yes in ST 103), next, it is determined whether or not the operation target is camera image region 12 related to upward camera 1 (ST 104).

Here, in a case where the operation target is not camera image region 12 related to upward camera 1, that is, the operation target is camera image region 12 related to horizontal camera 1 (No in ST 104), next, it is determined whether or not the touch operation is the swipe operation in the horizontal direction (ST 105). Here, in the case of the swipe operation in the horizontal direction (Yes in ST 105), processing condition setting unit 34 executes the pan adjustment (position adjustment in horizontal direction) according to a finger movement and updates the control parameter of pan (ST 106).

Here, in a case where the touch operation is not the swipe operation in the horizontal direction (No in ST 105), next, it is determined whether or not the touch operation is the swipe operation in the vertical direction (ST 107). Here, in the case of the swipe operation in the vertical direction (Yes in ST 107), processing condition setting unit 34 executes the tilt adjustment (position adjustment in vertical direction) according to the finger movement and updates the control parameter of tilt (ST 108).

On the other hand, in a case where the operation target is camera image region 12 related to upward camera 1 (Yes in ST 104), next, it is determined whether or not the touch operation is the swipe operation in the horizontal direction (ST 109). Here, in the case of the swipe operation in the horizontal direction (Yes in ST 109), processing condition setting unit 34 executes the rolling adjustment (position adjustment in rotation direction) according to the finger movement and updates the control parameter of rolling (ST 110).

Here, in a case where the touch operation is not the swipe operation in the horizontal direction (No in ST 109), next, it is determined whether or not the touch operation is the swipe operation in the vertical direction (ST 111). Here, in the case of the swipe operation in the vertical direction (Yes in ST 111), processing condition setting unit 34 executes the tilt adjustment (position adjustment in vertical direction) according to the finger movement and updates the control parameter of tilt (ST 112).

On the other hand, in a case where the touch operation is not the operation with one finger (No in ST 103), next, it is determined whether or not the touch operation is the operation with two fingers (ST 113).

Here, in a case where the touch operation is the operation with two fingers (Yes in ST 113), next, it is determined whether or not the touch operation is the rotation operation (ST 114). Here, in the case of the rotation operation (Yes in ST 114), processing condition setting unit 34 executes the rolling adjustment (position adjustment in rotation direction) according to the finger movement and updates the control parameter of rolling (ST 115).

In addition, in a case where the touch operation is not the rotation operation (No in ST 114), next, it is determined whether or not the touch operation is the pinch operation (ST 116). Here, in the case of the pinch operation (Yes in ST 116), processing condition setting unit 34 executes the zoom adjustment (extension/contraction adjustment) according to the finger movement and updates the control parameter of zoom (ST 117).

On the other hand, in a case where the touch operation is not the operation with two fingers (No in ST 113), it is determined that the touch operation is the operation with three or more fingers and next, it is determined whether or not the touch operation is the swipe operation in the horizontal direction (ST 118). Here, in the case of the swipe operation in the horizontal direction (Yes in ST 118), processing condition setting unit 34 executes the pan adjustment (position adjustment in horizontal direction) according to a finger movement and updates the control parameter of pan (ST 119).

Here, in a case where the touch operation is not the swipe operation in the horizontal direction (No in ST 118), next, it is determined whether or not the touch operation is the swipe operation in the vertical direction (ST 120). Here, in the case of the swipe operation in the vertical direction (Yes in ST 120), processing condition setting unit 34 executes the tilt adjustment (position adjustment in vertical direction) according to the finger movement and updates the control parameter of tilt (ST 121).

On the other hand, in a case where the touch operation is not the swipe operation in the vertical direction (No in ST 120), next, it is determined whether or not the touch operation is the rotation operation (ST 122). Here, in the case of the rotation operation (Yes in ST 122), processing condition setting unit 34 executes the rolling adjustment (position adjustment in rotation direction) according to the finger movement and updates the control parameter of rolling (ST 123).

In addition, in a case where the touch operation is not the rotation operation (No in ST 122), next, it is determined whether or not the touch operation is the pinch operation (ST 124). Here, in the case of the pinch operation (Yes in ST 124), processing condition setting unit 34 executes the zoom adjustment (extension/contraction adjustment) according to the finger movement and updates the control parameter of zoom (ST 125).

As described above, when the control parameters of the pan, the tilt, the rolling, and the zoom are updated by the touch operation of the user, panoramic image generation unit 42 of stitching processing unit 31 performs the process of generating the panoramic image based on the updated control parameter and next, image composition unit 45 performs the process of compositing the panoramic images and the generated composite image is displayed on the preview display screen (ST 126).

Figure 15:
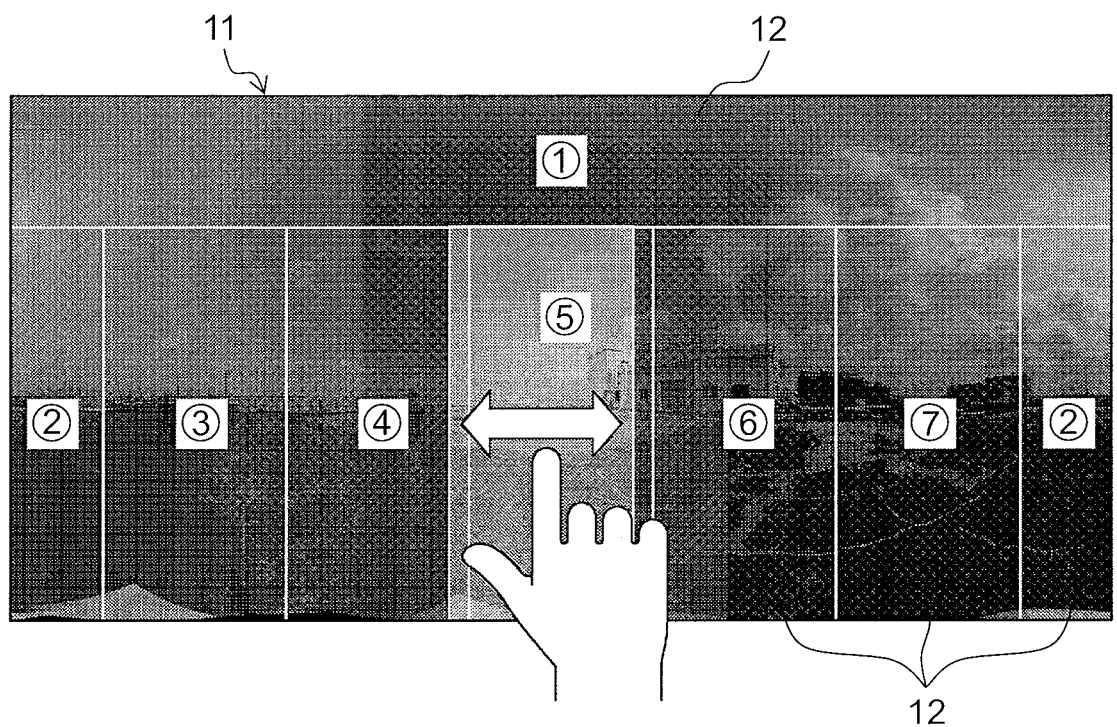
FIG. 15 is an explanatory diagram illustrating an image process of improving visibility of camera image region 12 to be adjusted.

Next, an image process of improving visibility of camera image region 12 to be adjusted will be described. FIG. 15 is an explanatory diagram illustrating the image process of improving the visibility of camera image region 12 to be adjusted.

In the present embodiment, composite image 11 changes a tone of camera image region 12 not to be adjusted from the initial tone, so that the image process is performed on image composition unit 45 to excellently improve visibility of camera image region 12 to be adjusted. Specifically, in the present embodiment, at least an image process of changing luminance is performed on camera image region 12 not to be adjusted. In the example illustrated in FIG. 15, the image process of lowering the luminance is performed on camera image region 12 not to be adjusted and camera image region 12 not to be adjusted is grayed out and darkly displayed.

Accordingly, in the preview display screen on which composite image 11 is displayed, camera image region 12 to be adjusted becomes conspicuous and the user can intuitively grasp camera image region 12 to be adjusted.

Figure 16:
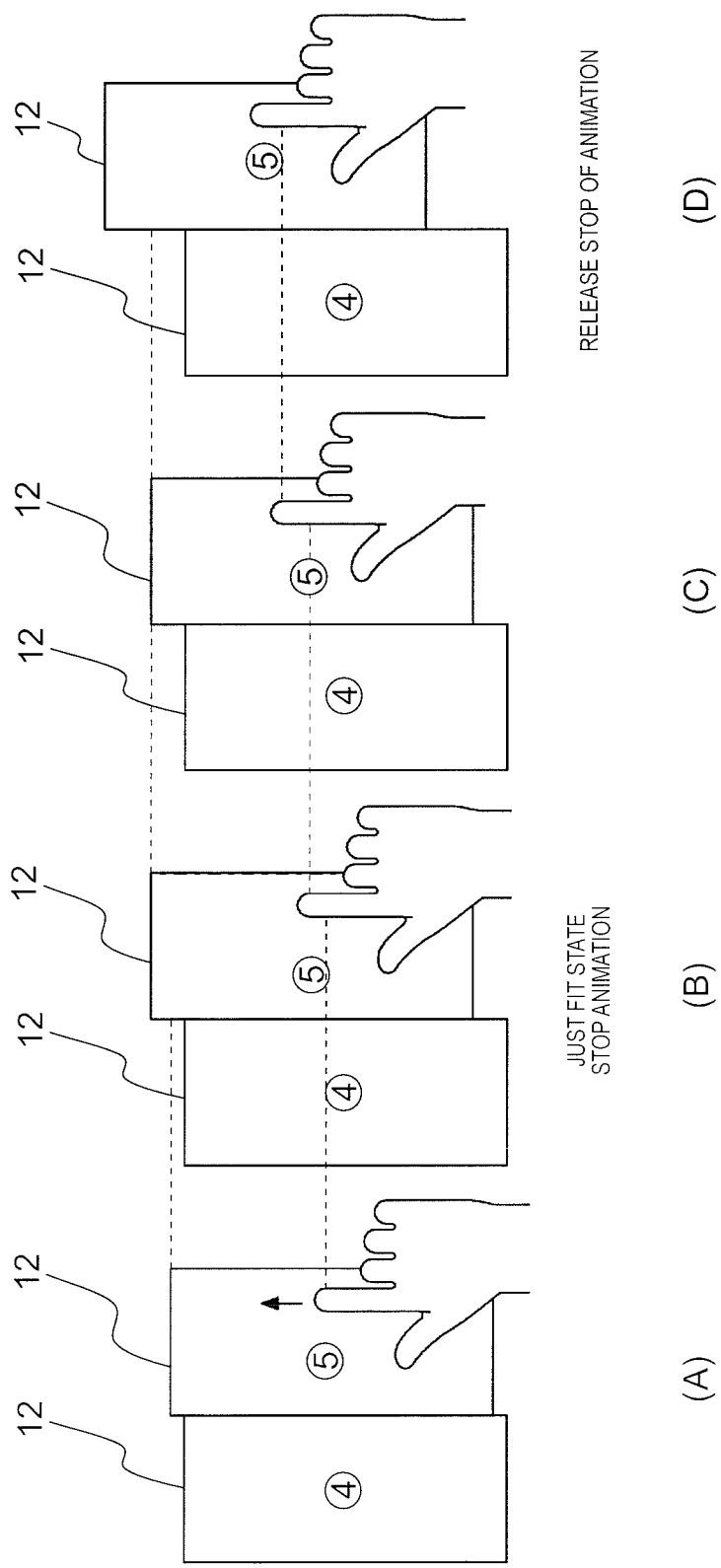
FIG. 16 is an explanatory diagram illustrating control of enabling the user to recognize a just fit state of camera image region 12 to be adjusted.

Next, control of causing the user to recognize the just fit state of camera image region 12 to be adjusted will be described. FIG. 16 is an explanatory diagram illustrating the control of causing the user to recognize the just fit state of camera image region 12 to be adjusted.

In the present embodiment, when a touch operation of adjusting camera image region 12 is performed on the preview display screen, the processing condition (control parameter related to generation of panoramic image) of stitching processing unit 31 is regularly updated according to the touch operation, the composition source image is updated according to this, and the composite image composited from the composition source images is regularly output from stitching processing unit 31. Accordingly, the composite image is displayed on the preview display screen as a video, at this time, an animation in which camera image region 12 to be operated changes in conjunction with the finger movement is executed.

In addition, in the present embodiment, just fit detection unit 46 detects the just fit state in which consistency of the stitching portion between camera image region 12 to be operated and adjacent camera image region 12 is high. Then, when just fit detection unit 46 detects the just fit state, the animation of camera image region 12 to be operated, that is, the movement of camera image region 12 in conjunction with the finger movement is stopped.

At this time, image composition unit 45 continuously outputs the composite image within a predetermined range based on the composition source image (panoramic image) obtained at a timing at which the just fit state is detected. Accordingly, on the preview display screen, camera image region 12 to be operated is displayed in a stationary state without interlocking with the finger movement.

In addition, the animation is stopped within a predetermined range and in a case of an outside of the predetermined range, the stop of animation is released. In this case, a timing of releasing the stop of the animation can be defined by a distance. That is, when the distance from a position of the just fit state to a touch position becomes larger than a predetermined distance, the stop of the animation is released. In addition, the timing of releasing the stop of the animation can be defined by a time. That is, when a predetermined time (for example, 1 second) elapses after the just fit state is detected, the stop of the animation is released.

In the example illustrated in FIG. 16, the swipe operation of sliding one finger touched on the screen in the vertical direction (up and down direction of image) is performed. As illustrated in (A) of FIG. 16, when the finger moves, camera image region 12 to be operated is moved in the vertical direction according to the finger movement. Then, at the timing illustrated in (B) of FIG. 16, when the just fit state is detected, as illustrated in (C) of FIG. 16, even if the finger further moves, camera image region 12 to be operated is stopped as it is. As illustrated in (D) of FIG. 16, when the finger further moves, camera image region 12 to be operated is moved in the vertical direction according to the finger movement.

In the present embodiment, when the just fit state of camera image region 12 to be adjusted is detected, the animation of camera image region 12 is stopped. Accordingly, the user can intuitively grasp the just fit state and it is possible to quickly perform the adjustment operation.

In the present embodiment, by stopping the animation of camera image region 12 to be operated, the user recognizes the just fit state. A method of causing the user to recognize the just fit state is not limited thereto. For example, at the timing of the just fit, camera image region 12 may be flashed (blinked). In addition, at the timing of the just fit, a frame line surrounding camera image region 12 may be displayed.

Figure 17:
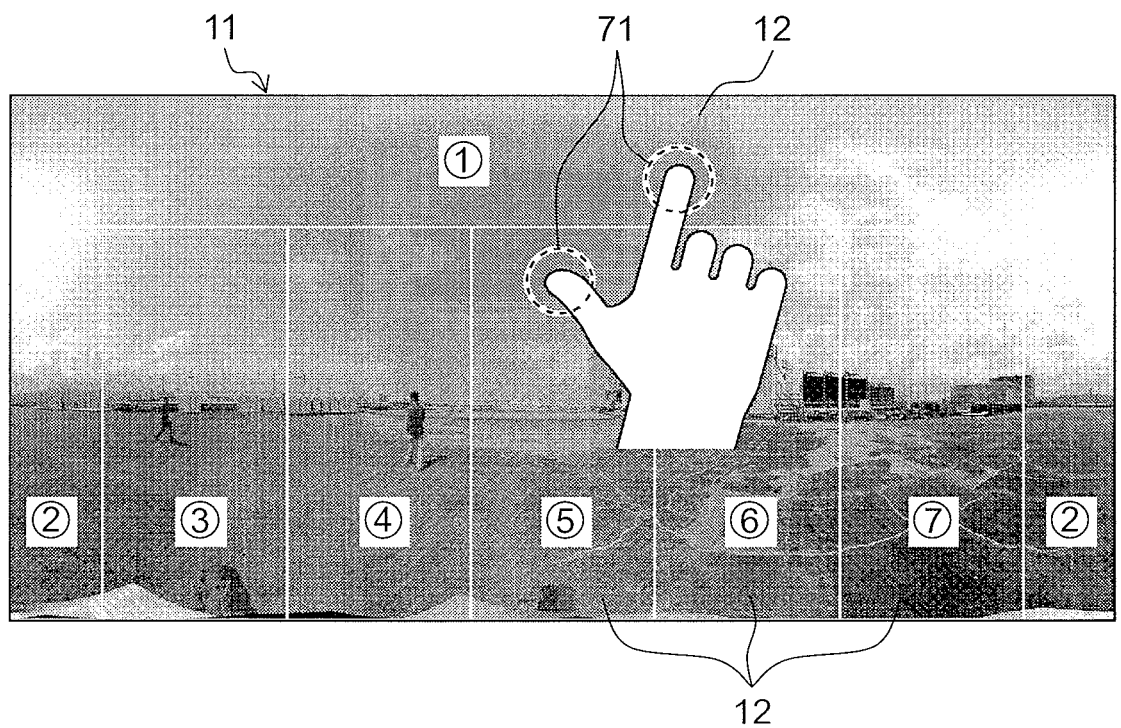
FIG. 17 is an explanatory diagram illustrating the touch operation when a tone and brightness of camera image region 12 are adjusted.

Next, a touch operation when a tone and brightness of camera image region 12 are adjusted will be described. FIG. 17 is an explanatory diagram illustrating the touch operation when the tone and the brightness of camera image region 12 are adjusted.

In the present embodiment, in a case where the touch operation is simultaneously performed on two camera image regions 12 with two fingers, two camera image regions 12 on which the touch operation is performed are set as the adjustment targets and image adjustment unit 35 performs the image adjustment between two camera image regions 12.

Specifically, in the present embodiment, the image adjustment is performed so that the tones and the brightness of touch regions 71 (predetermined range around touch position) in two camera image regions 12 on which the touch operation is performed are matched. In the example illustrated in FIG. 17, the touch operation is performed in a region of a sky in two camera image regions 12 so that the tones and the brightness of the sky in two camera image regions 12 are matched.

Accordingly, in a case where a difference in the tones and the brightness occurs in two camera image regions 12 in the region in which the tones and the brightness should be originally matched, by performing the touch operation on the region, it is possible to easily match the tones and the brightness of two camera image regions 12.

In the image adjustment, information on the tones and brightness of the touch region in two camera image regions 12 to be adjusted is obtained and camera 1 of an imaging source of two camera image regions 12 is controlled based on the information so that the tones and the brightness of the touch region in two camera image regions 12 are matched.

At this time, the imaging condition of camera 1, that is, the control parameter related to tones and brightness is adjusted so that the tones and the brightness in two camera image regions 12 are matched. Specifically, a white balance gain value in signal processing unit 23 is adjusted as a control parameter related to the tone (white balance). In addition, a shutter value (shutter speed) and a sensor gain value in image sensor unit 22, and a digital gain value in signal processing unit 23 are adjusted as control parameters related to brightness (exposure).

In the present embodiment, the touch operation is simultaneously performed on two camera image regions 12 with two fingers, so that the image adjustment of two camera image regions 12 is performed. When the touch operation is simultaneously performed on three or more camera image regions 12 with three or more fingers, the image adjustment of three or more camera image regions 12 can be performed. In addition, in the present embodiment, the control is performed so that both of the tones and the brightness are matched, but one of the tones and the brightness, for example, the control may be performed so that only the tones are matched.

As described above, the embodiment is described as an example of a technique disclosed in the present application. However, the technique in the present disclosure is not limited thereto. The technique also can be applied to the embodiment being changed, exchanged, added, and omitted. In addition, it is also possible to form a new embodiment by combining components in the embodiment described above.

For example, in the embodiment described above, the image processing device (including PC) provided separately from the camera unit having the plurality of cameras performs the image composition process or the like and outputs the composite image, but the embodiment can be configured as the camera unit (imaging device) mounting the image processing device.

In addition, the embodiment described above is configured to include the upward camera and the horizontal camera, but the embodiment may be configured to include a downward camera instead of the upward camera. Further, the embodiment may be configured to include both of the upward camera and the downward camera.

In addition, in the embodiment described above, when the preview display screen is displayed, a preview output switching unit outputs the input composition source image (panoramic image) to the image composition unit and the composition source image is not input to the disparity correction unit, but after the composition source image is input to the disparity correction unit, by setting the disparity correction amount to 0, the disparity correction process may not be actually performed.

Further, in the embodiment described above, the image processing device which generates the normal composite image executes the calibration for securing consistency between the camera image regions in the composite image, but the embodiment may be configured to include an exclusive device for the calibration, an exclusive program for the calibration may be installed in the information processing device, and the calibration may be executed.

INDUSTRIAL APPLICABILITY

An image processing device, an imaging system that includes the image processing device, and a calibration method according to the present disclosure are advantageous in that a user can conveniently perform adjustment work for calibration of securing consistency between camera image regions in a composite image, and are useful as an image processing device that outputs a composite image by performing an image composition process on an image for each of a plurality of cameras, an imaging system that includes the image processing device, a calibration method of securing consistency between camera image regions in the composite image, and the like.

REFERENCE MARKS IN THE DRAWINGS

1 CAMERA
2 CAMERA UNIT
3 IMAGE PROCESSING DEVICE
4 DISPLAY INPUT DEVICE
11 COMPOSITE IMAGE
12 CAMERA IMAGE REGION
31 STITCHING PROCESSING UNIT (IMAGE PROCESSING UNIT)
32 SCREEN GENERATION UNIT
33 TOUCH OPERATION DETERMINATION UNIT
34 PROCESSING CONDITION SETTING UNIT
35 IMAGE ADJUSTMENT UNIT
41 DISPARITY CORRECTION AMOUNT CALCULATOR
42 PANORAMIC IMAGE GENERATION UNIT

43 PREVIEW OUTPUT SWITCHING UNIT
44 DISPARITY CORRECTION UNIT
45 IMAGE COMPOSITION UNIT
46 JUST FIT DETECTION UNIT

The invention claimed is:

1. An image processing device that outputs a composite image by performing an image composition process on an image for each of a plurality of cameras, the image processing device comprising:
   a processor; and
   a memory including instructions that, when executed by the processor, cause the processor to perform operations, the operations including:
      generating a plurality of composition source images from the image for each of the plurality of cameras based on a preset processing condition;
      performing the image composition process on the plurality of composition source images to generate a composite image for preview, the composite image including a plurality of camera image regions, each of the plurality of camera image regions corresponding to one of the plurality of composition source images and one of the plurality of cameras;
      generating a preview display screen on which the composite image is displayed and outputting the preview display screen to a display;
      detecting a first touch operation that a user performs on the preview display screen displayed on the display and determining a first adjustment item according to the first touch operation, the first touch operation being performed with one or two fingers and in relation to a first camera image region of the plurality of camera image regions, the first camera image region corresponding to a first composition source image of the plurality of composition source images and a first camera of the plurality of cameras;
      first adjusting at least one of the first composition source image or the first camera according to the first adjustment item and updating the composite image;
      detecting a second touch operation that the user performs on the preview display screen displayed on the display and determining a second adjustment item, the second touch operation being performed with at least three fingers; and
      second adjusting at least one of all composition source images of the plurality of composition source images or all cameras of the plurality of cameras according to the second adjustment item and updating the composite image.

2. The image processing device of claim 1,
wherein the operations further include:
   detecting a third touch operation that the user performs on the preview display screen displayed on the display and determining a third adjustment item, the third touch operation being performed with two fingers and in relation to two camera image regions; and
   in a case where the third touch operation is performed, performing an image adjustment between the two camera image regions according to the third adjustment item.

3. The image processing device of claim 1,
wherein the operations further include:
   in a case where the first touch operation is performed, setting the first camera image region on which the first touch operation is performed as an adjustment target and determining the first adjustment item according to the first touch operation.

4. The image processing device of claim 3,
wherein the first adjusting includes:
   performing a pan adjustment in a case where the first touch operation is a swipe operation in a horizontal direction with one finger, performing a tilt adjustment in a case where the first touch operation is a swipe operation in a vertical direction with one finger, performing a rolling adjustment in a case where the first touch operation is a rotation operation with two fingers, and performing a zoom adjustment in a case where the first touch operation is a pinch operation with two fingers.

5. The image processing device of claim 1,
wherein the operations further include:
   performing image processing of changing a tone of at least one of the plurality of camera image regions not to be adjusted in the composite image from an initial tone.

6. The image processing device of claim 5,
wherein the operations further include:
   performing image processing of changing at least luminance on the at least one of the plurality of camera image regions not to be adjusted.

7. The image processing device of claim 1,
wherein the operations further include:
   in a case where the second touch operation is performed with at least three fingers, setting all of the plurality of camera image regions on which the second touch operation is performed as adjustment targets and determining the second adjustment item according to the second touch operation.

8. The image processing device of claim 1,
wherein the second adjusting includes:
   performing a pan adjustment in a case where the second touch operation is a swipe operation in a horizontal direction with at least three fingers, performing a tilt adjustment in a case where the second touch operation is a swipe operation in a vertical direction with at least three fingers, performing a rolling adjustment in a case where the second touch operation is a rotation operation with at least three fingers, performing a zoom adjustment in a case where the second touch operation is a pinch operation with at least three fingers.

9. The image processing device of claim 1,
wherein the operations further include:
   detecting a just fit state in which consistency of a stitching portion between the first camera image region to be adjusted and a second camera image region adjacent to the first camera image region to be adjusted in the composite image is high, and
   in a case of detecting that the just fit state is high, outputting the composite image within a predetermined range at a timing at which the just fit state is detected.

10. The image processing device of claim 1, further
wherein the operations further include:
   detecting a third touch operation that the user performs on the preview display screen displayed on the display and determining a third adjustment item, the third touch operation being performed with two fingers and in simultaneous relationship to two camera image regions; and in a case where the third touch operation is performed, performing an image adjustment so that at least either tones or brightness in the two camera image regions is matched.

11. The image processing device of claim 1, wherein the operations further include:
   performing a disparity correction process on the plurality of composition source images before the image composition process; and
   after the preview display screen is displayed, the disparity correction process is not performed on the plurality of composition source images.

12. An imaging system comprising:
   the image processing device according to claim 1;
   the plurality of cameras; and
   the display.

13. A calibration method of securing consistency between camera image regions in a composite image generated by performing an image composition process on an image for each of a plurality of cameras, the calibration method comprising:
   generating a plurality of composition source images from the image for each of the plurality of cameras based on a preset processing condition and performing the image composition process on the plurality of composition source images to generate a composite image for preview, the composite image including a plurality of camera image regions, each of the plurality of camera image regions corresponding to one of the plurality of composition source images and one of the plurality of cameras;
   generating a preview display screen on which the composite image is displayed and outputting the preview display screen to a display;
   detecting a first touch operation which a user performs on the preview display screen displayed on the display and determining a first adjustment item according to the first touch operation, the first touch operation being performed with one or two fingers and in relation to a first camera image region of the plurality of camera image regions, the first camera image region corresponding to a first composition source image of the plurality of composition source images and a first camera of the plurality of cameras;
   adjusting at least one of the first composition source image or the first camera according to the first adjustment item and updating the composite image;
   detecting a second touch operation that the user performs on the preview display screen displayed on the display and determining a second adjustment item, the second touch operation being performed with at least three fingers; and
   adjusting at least one of all composition source images of the plurality of composition source images or all cameras of the plurality of cameras according to the second adjustment item and updating the composite image.

14. The image processing device of claim 1, wherein, in the second adjusting, all cameras of the plurality of cameras are adjusted according to the second adjustment item.

* * * * *